(12) United States Patent
Xiong et al.

(10) Patent No.: US 9,521,718 B2
(45) Date of Patent: Dec. 13, 2016

(54) LED TUBE LAMP HAVING MODE SWITCHING CIRCUIT

(71) Applicant: JIAXING SUPER LIGHTING ELECTRIC APPLIANCE CO., LTD, Jiaxing (CN)

(72) Inventors: Aiming Xiong, Jiaxing (CN); Xintong Liu, Jiaxing (CN)

(73) Assignee: JIAXING SUPER LIGHTING ELECTRIC APPLIANCE CO., LTI, Jianxing, Zhejiang (CN)

( * ) Notice: Subject to any disclaimer, the term of this patent is extended or adjusted under 35 U.S.C. 154(b) by 0 days.

(21) Appl. No.: 15/084,483

(22) Filed: Mar. 30, 2016

(65) Prior Publication Data

US 2016/0212809 A1    Jul. 21, 2016

Related U.S. Application Data

(63) Continuation-in-part of application No. 14/865,387, filed on Sep. 25, 2015.

(30) Foreign Application Priority Data

Sep. 28, 2014 (CN) .......................... 2014 1 0507660
Sep. 28, 2014 (CN) .......................... 2014 1 0508899
(Continued)

(51) Int. Cl.
*H05B 37/00* (2006.01)
*H05B 39/00* (2006.01)
(Continued)

(52) U.S. Cl.
CPC ............. *H05B 33/0815* (2013.01); *F21K 9/27* (2016.08); *H05B 33/0809* (2013.01);
(Continued)

(58) Field of Classification Search
None
See application file for complete search history.

(56) References Cited

U.S. PATENT DOCUMENTS 5,575,459 A    11/1996   Anderson
5,921,660 A     7/1999   Yu
(Continued)

FOREIGN PATENT DOCUMENTS

CN    200965185 Y    10/2007
CN    101715265 A     5/2010
(Continued)

OTHER PUBLICATIONS

PCT Search Report for International Application No. PCT/CN2015/090859 dated Jan. 4, 2016.
(Continued)

*Primary Examiner* — Anh Tran
(74) *Attorney, Agent, or Firm* — Muir Patent Law, PLLC

(57) ABSTRACT

The LED tube lamp includes a lamp tube configured to receive an external driving signal; a rectifying circuit configured to rectify the external driving signal to produce a rectified signal; a filtering circuit coupled to the rectifying circuit, and configured to filter the rectified signal to produce a filtered signal, wherein the filtering circuit has a first filtering output terminal and a second filtering output terminal; an LED lighting module coupled to the filtering circuit, wherein the LED lighting module includes a driving circuit having a first driving output terminal and a second driving output terminal and configured to receive the filtered signal to produce a driving signal, and an LED module configured to receive the driving signal and emit light; and a mode switching circuit coupled to at least one of the first and the second filtering output terminal and at least one of the first and the second driving output terminal, and con-
(Continued)

figured to determine to perform one of a first driving mode and a second driving mode.

20 Claims, 12 Drawing Sheets

(30) Foreign Application Priority Data

| | | | |
|---|---|---|---|
| Nov. 6, 2014 | (CN) | ............................ | 2014 1 0623355 |
| Dec. 5, 2014 | (CN) | ............................ | 2014 1 0734425 |
| Feb. 12, 2015 | (CN) | ............................ | 2015 1 0075925 |
| Mar. 10, 2015 | (CN) | ............................ | 2015 1 0104823 |
| Mar. 25, 2015 | (CN) | ............................ | 2015 1 0133689 |
| Mar. 26, 2015 | (CN) | ............................ | 2015 1 0134586 |
| Mar. 27, 2015 | (CN) | ............................ | 2015 1 0136796 |
| Apr. 3, 2015 | (CN) | ............................ | 2015 1 0155807 |
| Apr. 14, 2015 | (CN) | ............................ | 2015 1 0173861 |
| Apr. 22, 2015 | (CN) | ............................ | 2015 1 0193980 |
| May 19, 2015 | (CN) | ............................ | 2015 1 0259151 |
| May 22, 2015 | (CN) | ............................ | 2015 1 0268927 |
| May 29, 2015 | (CN) | ............................ | 2015 1 0284720 |
| Jun. 10, 2015 | (CN) | ............................ | 2015 1 0315636 |
| Jun. 17, 2015 | (CN) | ............................ | 2015 1 0338027 |
| Jun. 26, 2015 | (CN) | ............................ | 2015 1 0364735 |
| Jun. 26, 2015 | (CN) | ............................ | 2015 1 0372375 |
| Jun. 26, 2015 | (CN) | ............................ | 2015 1 0373492 |
| Jun. 29, 2015 | (CN) | ............................ | 2015 1 0378322 |
| Jul. 2, 2015 | (CN) | ............................ | 2015 1 0391910 |
| Jul. 10, 2015 | (CN) | ............................ | 2015 1 0406595 |
| Aug. 7, 2015 | (CN) | ............................ | 2015 1 0482944 |

(51) Int. Cl.
  *H05B 41/14*  (2006.01)
  *H05B 33/08*  (2006.01)
  *F21V 29/83*  (2015.01)
  *F21V 23/00*  (2015.01)

(52) U.S. Cl.
  CPC .............. *F21V 23/003* (2013.01); *F21V 29/83* (2015.01); *F21Y 2103/10* (2016.08); *F21Y 2115/10* (2016.08)

(56) References Cited

U.S. PATENT DOCUMENTS

| | | | |
|---|---|---|---|
| 6,127,783 | A | 10/2000 | Pashley |
| 6,609,813 | B1 | 8/2003 | Showers |
| 6,796,680 | B1 | 9/2004 | Showers |
| 7,033,239 | B2 | 4/2006 | Cunkelman |
| 8,360,599 | B2 | 1/2013 | Ivey |
| 8,579,463 | B2 | 11/2013 | Clough |
| 2002/0044456 | A1 | 4/2002 | Balestriero |
| 2002/0176262 | A1 | 11/2002 | Tripathi |
| 2003/0102819 | A1 | 6/2003 | Min |
| 2003/0231485 | A1 | 12/2003 | Chien |
| 2004/0095078 | A1 | 5/2004 | Leong |
| 2004/0189218 | A1 | 9/2004 | Leong |
| 2005/0128751 | A1 | 6/2005 | Roberge |
| 2005/0162850 | A1 | 7/2005 | Luk |
| 2005/0207166 | A1 | 9/2005 | Kan |
| 2005/0213321 | A1 | 9/2005 | Lin |
| 2007/0001709 | A1 | 1/2007 | Shen |
| 2007/0145915 | A1 | 6/2007 | Roberge |
| 2007/0210687 | A1 | 9/2007 | Axelsson |
| 2007/0274084 | A1 | 11/2007 | Kan |
| 2008/0030981 | A1 | 2/2008 | Mrakovich |
| 2008/0192476 | A1 | 8/2008 | Hiratsuka |
| 2008/0278941 | A1 | 11/2008 | Logan |
| 2009/0161359 | A1 | 6/2009 | Siemiet |
| 2010/0253226 | A1 | 10/2010 | Oki |
| 2011/0038146 | A1 | 2/2011 | Chen |
| 2011/0057572 | A1 | 3/2011 | Kit et al. |
| 2011/0090684 | A1 | 4/2011 | Logan |
| 2011/0148313 | A1 | 6/2011 | Ramaker |
| 2011/0216538 | A1 | 9/2011 | Logan |
| 2012/0069556 | A1 | 3/2012 | Bertram |
| 2012/0106157 | A1 | 5/2012 | Simon |
| 2012/0153873 | A1 | 6/2012 | Hayashi |
| 2012/0235578 | A1 | 9/2012 | Miller |
| 2013/0050998 | A1 | 2/2013 | Chu et al. |
| 2013/0170245 | A1 | 7/2013 | Hong |
| 2013/0182425 | A1 | 7/2013 | Seki |
| 2013/0200797 | A1 | 8/2013 | Timmermans |
| 2013/0221867 | A1* | 8/2013 | Deppe ................. H05B 33/0809 315/224 |
| 2014/0071667 | A1 | 3/2014 | Hayashi |
| 2014/0153231 | A1 | 6/2014 | Bittmann |
| 2014/0226320 | A1 | 8/2014 | Halliwell |
| 2015/0009688 | A1 | 1/2015 | Timmermans |
| 2015/0077002 | A1* | 3/2015 | Takahashi .......... H05B 33/0803 315/193 |

FOREIGN PATENT DOCUMENTS

| | | |
|---|---|---|
| CN | 102155642 A | 8/2011 |
| CN | 202125774 U | 1/2012 |
| CN | 102355780 A | 2/2012 |
| CN | 102518972 A | 6/2012 |
| CN | 102932997 A | 2/2013 |
| CN | 203240337 | 10/2013 |
| CN | 203927469 | 11/2014 |
| CN | 204268162 | 4/2015 |
| CN | 204300737 U | 4/2015 |
| CN | 104595765 A | 5/2015 |
| CN | 204420636 U | 6/2015 |
| WO | WO2011/132120 A1 | 10/2011 |
| WO | WO2013/125803 A1 | 8/2013 |
| WO | WO2014/001475 A1 | 1/2014 |
| WO | WO2015/036478 A1 | 3/2015 |

OTHER PUBLICATIONS

PCT Search Report for International Application No. PCT/CN2015/090814 dated Dec. 30, 2015.

* cited by examiner

US 9,521,718 B2

LED TUBE LAMP HAVING MODE SWITCHING CIRCUIT

CROSS-REFERENCE TO RELATED APPLICATIONS

This application is a Continuation-In-Part of U.S. application Ser. No.: 14/865,387, filed on Sep. 25, 2015 the disclosure of which is incorporated herein by reference in its entirety, and which claims the benefit of priority under 35 U.S.C. §119 to the following Chinese Patent Applications, filed with the State Intellectual Property Office (SIPO), the contents of each of which are incorporated herein by reference in their entirety: CN 201410507660.9 filed on Sep. 28, 2014; CN 201410508899.8 filed on Sep. 28, 2014; CN 201410623355.6 filed on Nov. 6, 2014; CN 201410734425.5 filed on Dec. 5, 2014; CN 201510075925.7 filed on Feb. 2, 2015; CN 201510104823.3 filed on Mar. 10, 2015; CN 201510134586.5 filed on Mar. 3, 2015; CN 201510133689.x filed on Mar. 3, 2015; CN 201510136796.8 filed on Mar. 27, 2015; CN 201510173861.4 filed on Apr. 14, 2015; CN 201510155807.7 filed on Apr. 3, 2015; CN 201510193980.6 filed on Apr. 22, 2015; CN 201510372375.5 filed on Jun. 26, 2015; CN 201510259151.3 filed on May 5, 2015; CN 201510268927.8 filed on May, 5, 2015; CN 201510284720.x filed on May, 5, 2015; CN 201510338027.6 filed on Jun. 17, 2015; CN 201510315636.x filed on Jun. 10, 2015; CN 201510373492.3 filed on Jun. 26, 2015; CN 201510364735.7 filed on Jun. 6, 2015; CN 201510378322.4 filed on Jun. 29, 2015; CN 201510391910.1 filed on Jul. 2, 2015; CN 201510406595.5 filed on Jul. 10, 2015; CN 201510482944.1 filed on Aug. 7, 2015; CN 201510486115.0 filed on Aug. 8, 2015; CN 201510428680.1 filed on Jul. 20, 2015; CN 201510483475.5 filed on Aug. 8, 2015; CN 201510555543.4 filed on Sep. 2, 2015; CN 201510557717.0 filed on Sep. 9, 2015; and CN 201510595173.7 filed on Sep. 18, 2015. This application also claims priority under 35 U.S.C. 119(e) to Chinese Patent Application No. CN 201510324394.0, filed on Jun 12, 2015, the disclosure of which is incorporated herein in its entirety by reference.

FIELD OF THE DISCLOSURE

The present disclosure relates to illumination devices, and more particularly to a light emitting diode (LED) tube lamp and its components including the light sources, electronic components, and end caps.

BACKGROUND

LED lighting technology is rapidly developing to replace traditional incandescent and fluorescent lighting. LED tube lamps are mercury-free in comparison with fluorescent tube lamps that need to be filled with inert gas and mercury. Thus, it is not surprising that LED tube lamps are becoming a highly desired illumination option among different available lighting systems used in homes and workplaces, which used to be dominated by traditional lighting options such as compact fluorescent light bulbs (CFLs) and fluorescent tube lamps. Benefits of LED tube lamps include improved durability and longevity and far less energy consumption. Therefore, when taking into account all factors, they would typically be considered as a cost effective lighting option.

Typical LED tube lamps have a lamp tube, a circuit board disposed inside the lamp tube with light sources being mounted on the circuit board, and end caps accompanying a power supply provided at two ends of the lamp tube with the electricity from the power supply transmitting to the light sources through the circuit board. However, existing LED tube lamps have certain drawbacks.

For example, circuit design of current LED tube lamps mostly doesn't provide suitable solutions for complying with relevant certification standards and for better compatibility with the driving structure using an electronic ballast originally for a fluorescent lamp. For example, since there are usually no electronic components in a fluorescent lamp, it's fairly easy for a fluorescent lamp to be certified under EMI (electromagnetic interference) standards and safety standards for lighting equipment as provided by Underwriters Laboratories (UL). However, there are a considerable number of electronic components in an LED tube lamp, and therefore consideration of the impacts caused by the layout (structure) of the electronic components is important, resulting in difficulties in complying with such standards.

Common main types of electronic ballast include instant-start ballast and program-start ballast. Electronic ballast typically includes a resonant circuit and is designed to match the loading characteristics of a fluorescent lamp in driving the fluorescent lamp. For example, for properly starting a fluorescent lamp, the electronic ballast provides driving methods respectively corresponding to the fluorescent lamp working as a capacitive device before emitting light, and working as a resistive device upon emitting light. But an LED is a nonlinear component with significantly different characteristics from a fluorescent lamp. Therefore, using an LED tube lamp with an electronic ballast impacts the resonant circuit design of the electronic ballast, which may cause a compatibility problem. Generally, a program-start ballast will detect the presence of a filament in a fluorescent lamp, but traditional LED driving circuits cannot support the detection and may cause a failure of the filament detection and thus failure of the starting of the LED tube lamp. Further, electronic ballast is in effect a current source, and when it acts as a power supply of a DC-to-DC converter circuit in an LED tube lamp, problems of overvoltage and overcurrent or undervoltage and undercurrent are likely to occur, resulting in damaging of electronic components in the LED tube lamp or unstable provision of lighting by the LED tube lamp.

Further, the driving of an LED uses a DC driving signal, but the driving signal for a fluorescent lamp is a low-frequency, low-voltage AC signal as provided by an AC powerline, a high-frequency, high-voltage AC signal provided by a ballast, or even a DC signal provided by a battery for emergency lighting applications. Since the voltages and frequency spectrums of these types of signals differ significantly, simply performing a rectification to produce the required DC driving signal in an LED tube lamp may not achieve the LED tube lamp's compatibility with traditional driving systems of a fluorescent lamp.

Nowadays, LED tube lamps used to replace traditional fluorescent lighting devices can be primarily categorized into two types. One is for ballast-compatible LED tube lamps, e.g., T-LED lamp, which directly replaces fluorescent tube lamps without changing any circuit on the lighting device; and the other one is for ballast by-pass LED tube lamps, which omit traditional ballast on their circuit and directly connect the commercial electricity to the LED tube lamp. The latter LED tube lamp is suitable for the new surroundings in fixtures with new driving circuits and LED tube lamps.

Accordingly, there is a desire to make the power supply components of LED lights be able to select the appropriate mode circuit for different applications of environment or driving system to improve the compatibility with various types of driving systems of LED lights.

SUMMARY OF THE INVENTION

It's specially noted that the present disclosure may include one or more inventions claimed currently or not yet claimed, and for avoiding confusion due to unnecessarily distinguishing between those possible inventions at the stage of preparing the specification, the possible plurality of inventions herein may be collectively referred to as "the (present) invention" herein.

Various embodiments are summarized in this section, and may be described with respect to the "invention" or the "present invention," which terminology is used to describe certain presently disclosed embodiments, whether claimed or not, and is not necessarily an exhaustive description of all possible embodiments, but rather is merely a summary of certain embodiments. Certain of the embodiments described below as various aspects of the "invention" or the "present invention" can be combined in different manners to form an LED tube lamp or a portion thereof.

The present disclosure provides an LED tube lamp, and aspects thereof.

According to certain embodiments, a light-emitting diode (LED) tube lamp includes: a lamp tube, configured to receive an external driving signal; a rectifying circuit, configured to rectify the external driving signal to produce a rectified signal; a filtering circuit, coupled to the rectifying circuit, and configured to filter the rectified signal to produce a filtered signal, wherein the filtering circuit has a first filtering output terminal and a second filtering output terminal; an LED lighting module, coupled to the filtering circuit, wherein the LED lighting module includes a driving circuit having a first driving output terminal and a second driving output terminal and configured to receive the filtered signal to produce a driving signal, and an LED module configured to receive the driving signal and emit light; and a mode switching circuit, coupled to at least one of the first filtering output terminal and the second filtering output terminal and at least one of the first driving output terminal and the second driving output terminal, and configured to select between performing one of a first driving mode and a second driving mode, wherein the LED tube lamp is configured such that the filtered signal is input to the driving circuit in the first driving mode, and the filtered signal is input to the LED module as the driving signal by bypassing the driving circuit in the second driving mode.

In some embodiments, the LED module is coupled between the first and the second driving output terminals.

In some embodiments, the mode switching circuit determines to input the filtered signal to one of the driving circuit and the LED module based on a frequency of the external driving signal.

In some embodiments, the mode switching circuit inputs the filtered signal to the LED module when a frequency of the external driving signal is higher than a predefined mode switching frequency. Alternatively, the mode switching circuit inputs the filtered signal to the driving circuit when the frequency of the external driving signal is lower than the predefined mode switching frequency.

In some embodiments, the driving circuit further includes a switch, a diode, and an inductor. Wherein, a first pin of the switch is coupled to an anode of the diode, a second pin of the switch is coupled to the second filtering output terminal, and a control pin of the switch is coupled to a controller; a cathode of the diode is coupled to the first filtering output terminal and the first driving output terminal; a first pin of the inductor is coupled to the first pin of the switch, and a second pin of the inductor is coupled to the mode switching circuit.

In some embodiments, the mode switching circuit includes a mode switching switch having a first terminal, a second terminal, and a third terminal. Wherein, the first terminal is coupled to the second driving output terminal, the second terminal is coupled to the second filtering output terminal, and the third terminal is coupled to the second pin of the inductor.

In some embodiments, the driving circuit further includes a switch, a diode, and an inductor. Wherein, a first pin of the switch is coupled to an anode of the diode, a second pin of the switch is coupled to the mode switching circuit, and a control pin of the switch is coupled to a controller; a cathode of the diode is coupled to the first filtering output terminal and the first driving output terminal; a first pin of the inductor is coupled to the first pin of the switch, and a second pin of the inductor is coupled to the second driving output terminal.

In some embodiments, the mode switching circuit includes a mode switching switch having a first terminal, a second terminal, and a third terminal. Wherein, the first terminal is coupled to the second filtering output terminal, the second terminal is coupled to the second driving output terminal, and the third terminal is coupled to the second pin of the switch.

In some embodiments, the driving circuit further includes a switch, a diode, and an inductor. Wherein, a first pin of the switch is coupled to an anode of the diode, a second pin of the switch is coupled to the second filtering output terminal and the second driving output terminal, and a control pin of the switch is coupled to a controller; a cathode of the diode is coupled to the first driving output terminal; a first pin of the inductor is coupled to the first pin of the switch, and a second pin of the inductor is coupled to the mode switching circuit.

In some embodiments, the mode switching circuit includes a mode switching switch having a first terminal, a second terminal, and a third terminal. Wherein, the first terminal is coupled to the first filtering output terminal, the second terminal is coupled to the first driving output terminal, and the third terminal is coupled to the second pin of the inductor.

In some embodiments, the driving circuit further includes a switch, a diode, and an inductor. Wherein, a first pin of the switch is coupled to an anode of the diode, a second pin of the switch is coupled to the second filtering output terminal and the second driving output terminal, and a control pin of the switch is coupled to a controller; a cathode of the diode is coupled to the mode switching circuit; a first pin of the inductor is coupled to the first pin of the switch, and a second pin of the inductor is coupled to the first filtering output terminal.

In some embodiments, the mode switching circuit includes a mode switching switch having a first terminal, a second terminal, and a third terminal. Wherein, the first terminal is coupled to the first driving output terminal, the second terminal is coupled to the first filtering output terminal, and the third terminal is coupled to the cathode of the diode.

In some embodiments, the driving circuit further includes a switch, a diode, and an inductor. Wherein, a first pin of the switch is coupled to the mode switching circuit, a second pin of the switch is coupled to a cathode of the diode, and a control pin of the switch is coupled to a controller; an anode of the diode is coupled to the second filtering output terminal and the second driving output terminal; a first pin of the inductor is coupled to the second pin of the switch, and a second pin of the inductor is coupled to the first driving output terminal.

In some embodiments, the mode switching circuit includes a mode switching switch having a first terminal, a second terminal, and a third terminal. Wherein, the first terminal is coupled to the first filtering output terminal, the second terminal is coupled to the first driving output terminal, and the third terminal is coupled to the first pin of the switch.

In some embodiments, the driving circuit further includes a switch, a diode, and an inductor. Wherein, a first pin of the switch is coupled to the first filtering output terminal, a second pin of the switch is coupled to a cathode of the diode, and a control pin of the switch is coupled to a controller; an anode of the diode is coupled to the second filtering output terminal and the second driving output terminal; a first pin of the inductor is coupled to the second pin of the switch, and a second pin of the inductor is coupled to the mode switching circuit.

In some embodiments, the mode switching circuit includes a mode switching switch having a first terminal, a second terminal, and a third terminal. Wherein, the first terminal is coupled to the first driving output terminal, the second terminal is coupled to the first filtering output terminal, and the third terminal is coupled to the second pin of the inductor.

In some embodiments, the driving circuit further includes a switch, a diode, and an inductor. Wherein, a first pin of the switch is coupled to an anode of the diode, a second pin of the switch is coupled to the second filtering output terminal, and a control pin of the switch is coupled to a controller; a cathode of the diode is coupled to the mode switching circuit; a first pin of the inductor is coupled to the first pin of the switch, and a second pin of the inductor is coupled to the first filtering output terminal.

In some embodiments, the mode switching circuit includes a first mode switching switch having a first terminal, a second terminal, and a third terminal, and a second mode switching switch having a fourth terminal, a fifth terminal, and a sixth terminal. Wherein, the first terminal is coupled to the first driving output terminal, the second terminal is coupled to the first filtering output terminal, the third terminal is coupled to the cathode of the diode, the fourth terminal is coupled to the second driving output terminal, the fifth terminal is coupled to the second filtering output terminal, and the sixth terminal is coupled to the first filtering output terminal.

In some embodiments, the driving circuit further includes a switch, a diode, and an inductor. Wherein, a first pin of the switch is coupled to an anode of the diode, a second pin of the switch is coupled to the mode switching circuit, and a control pin of the switch is coupled to a controller; a cathode of the diode is coupled to the first driving output terminal; a first pin of the inductor is coupled to the first pin of the switch, and a second pin of the inductor is coupled to the second driving output terminal.

In some embodiments, the mode switching circuit includes a first mode switching switch having a first terminal, a second terminal, and a third terminal, and a second mode switching switch having a fourth terminal, a fifth terminal, and a sixth terminal. Wherein, the first terminal is coupled to the second filtering output terminal, the second terminal is coupled to the second driving output terminal, the third terminal is coupled to the second pin of the switch, the fourth terminal is coupled to the first filtering output terminal, the fifth terminal is coupled to the first driving output terminal, and the sixth terminal is coupled to the second driving output terminal.

In some embodiments, an LED tube lamp includes a lamp tube, configured to receive an external signal; a filtering circuit, configured to filter a received signal and output a filtered signal, the filtered signal derived from the external signal, wherein the filtering circuit has a first filtering output terminal and a second filtering output terminal; an LED driving circuit coupled to the filtering circuit and having a first driving output terminal and a second driving output terminal, the driving circuit configured to receive the filtered signal and to produce a driving signal; an LED module coupled to the LED driving circuit and configured to receive the driving signal and emit light; and a mode switching circuit, coupled to at least one of the first filtering output terminal and the second filtering output terminal and at least one of the first driving output terminal and the second driving output terminal, and configured to select between performing one of a first driving mode and a second driving mode. The mode switching circuit is configured to cause the LED driving circuit to operate to receive the filtered signal and produce the driving signal when the first driving mode is selected, and to cause the LED driving circuit to be bypassed in the second driving mode.

DETAILED DESCRIPTION

Figure 1:
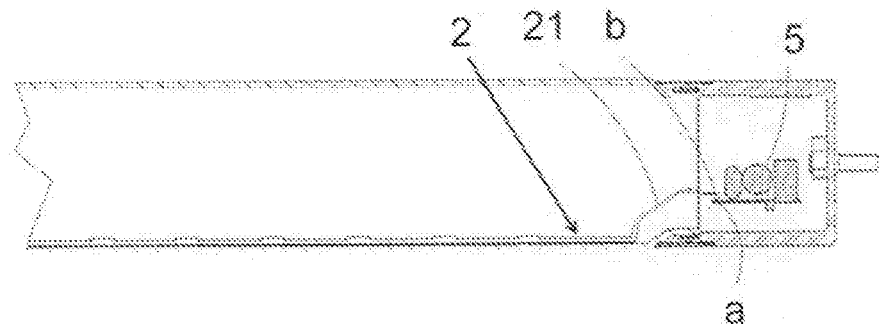
FIG. 1 is a plane cross-sectional view schematically illustrating an LED tube lamp including an LED light strip that is a bendable circuit sheet with ends thereof passing across the transition region of the lamp tube of the LED tube lamp to be connected to a power supply according to some embodiments.

The present disclosure will now be described in the following embodiments with reference to the drawings. The following descriptions of various embodiments of this invention are presented herein for purpose of illustration and giving examples only. It is not intended to be exhaustive or to be limited to the precise form disclosed. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

In the drawings, the size and relative sizes of components may be exaggerated for clarity. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

It will be understood that, although the terms first, second, third etc. may be used herein to describe various elements, components, regions, layers, or steps, these elements, components, regions, layers, and/or steps should not be limited by these terms. Unless the context indicates otherwise, these terms are only used to distinguish one element, component, region, layer, or step from another element, component, region, or step, for example as a naming convention. Thus, a first element, component, region, layer, or step discussed below in one section of the specification could be termed a second element, component, region, layer, or step in another section of the specification or in the claims without departing from the teachings of the present invention. In addition, in certain cases, even if a term is not described using "first," "second," etc., in the specification, it may still be referred to as "first" or "second" in a claim in order to distinguish different claimed elements from each other.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). However, the term "contact," as used herein refers to direct connection (i.e., touching) unless the context indicates otherwise.

Embodiments described herein will be described referring to plane views and/or cross-sectional views by way of ideal schematic views. Accordingly, the exemplary views may be modified depending on manufacturing technologies and/or tolerances. Therefore, the disclosed embodiments are not limited to those shown in the views, but include modifications in configuration formed on the basis of manufacturing processes. Therefore, regions exemplified in figures may have schematic properties, and shapes of regions shown in figures may exemplify specific shapes of regions of elements to which aspects of the invention are not limited.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Terms such as "same," "equal," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning.

Terms such as "about" or "approximately" may reflect sizes, orientations, or layouts that vary only in a small relative manner, and/or in a way that does not significantly alter the operation, functionality, or structure of certain elements. For example, a range from "about 0.1 to about 1"

may encompass a range such as a 0%-5% deviation around 0.1 and a 0% to 5% deviation around 1, especially if such deviation maintains the same effect as the listed range.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As used herein, items described as being "electrically connected" are configured such that an electrical signal can be passed from one item to the other. Therefore, a passive electrically conductive component (e.g., a wire, pad, internal electrical line, etc.) physically connected to a passive electrically insulative component (e.g., a prepreg layer of a printed circuit board, an electrically insulative adhesive connecting two devices, an electrically insulative underfill or mold layer, etc.) is not electrically connected to that component. Moreover, items that are "directly electrically connected," to each other are electrically connected through one or more passive elements, such as, for example, wires, pads, internal electrical lines, resistors, etc. As such, directly electrically connected components do not include components electrically connected through active elements, such as transistors or diodes. Components that contact each other and are directly electrically connected may be described as directly electrically and physically connected.

Components described as thermally connected or in thermal communication are arranged such that heat will follow a path between the components to allow the heat to transfer from the first component to the second component. Simply because two components are part of the same device or board does not make them thermally connected. In general, components which are heat-conductive and directly connected to other heat-conductive or heat-generating components (or connected to those components through intermediate heat-conductive components or in such close proximity as to permit a substantial transfer of heat) will be described as thermally connected to those components, or in thermal communication with those components. On the contrary, two components with heat-insulative materials therebetween, which materials significantly prevent heat transfer between the two components, or only allow for incidental heat transfer, are not described as thermally connected or in thermal communication with each other. The terms "heat-conductive" or "thermally-conductive" do not apply to any material that provides incidental heat conduction, but are intended to refer to materials that are typically known as good heat conductors or known to have utility for transferring heat, or components having similar heat conducting properties as those materials.

Referring to FIG. 1, an LED tube lamp may include an LED light strip that is a bendable circuit sheet with ends thereof passing across a transition region of the lamp tube of the LED tube lamp to be connected to a power supply. In some embodiments, the ends of the bendable circuit sheet may be connected to a power supply in an end cap of the LED tube lamp. For example, the ends may be connected in a manner such that a portion of the bendable circuit sheet is bent away from the lamp tube and passes through the transition region where a lamp tube narrows, and such that the bendable circuit sheet vertically overlaps part of a power supply within an end cap of the LED tube lamp.

Figure 2:
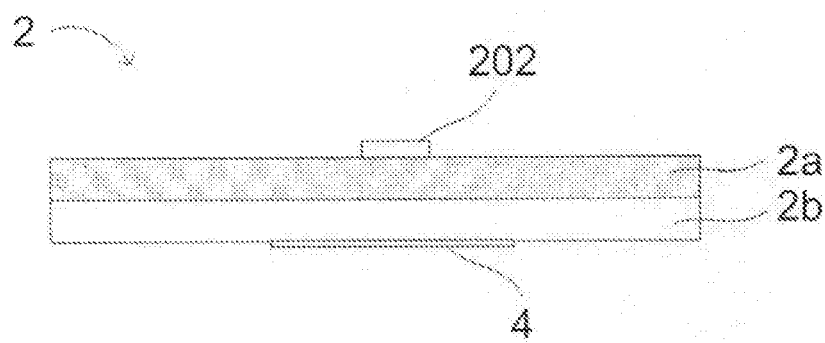
FIG. 2 is a plane cross-sectional view schematically illustrating a bi-layered structure of a bendable circuit sheet of an LED light strip of an LED tube lamp according to some embodiments.

Referring to FIG. 2, to form an LED light strip 2, a bendable circuit sheet includes a wiring layer 2a with conductive effect. An LED light source 202 is disposed on the wiring layer 2a (only one is shown in FIG. 2 as an example, though as shown in FIG. 1, multiple LED light sources 202 may be mounted on the bendable circuit sheet) and is electrically connected to the power supply through the wiring layer 2a. The wiring layer with conductive effect, in this specification, is also called conductive layer. Referring to FIG. 2 again, in one embodiment, the LED light strip 2 includes a bendable circuit sheet having a conductive wiring layer 2a and a dielectric layer 2b that are arranged in a stacked manner. In some embodiments, the wiring layer 2a and the dielectric layer 2b have the same areas. The LED light source 202 is disposed on one surface of the wiring layer 2a, the dielectric layer 2b is disposed on the other surface of the wiring layer 2a that is away from the LED light sources 202 (e.g., a second, opposite surface from the first surface on which the LED light source 202 is disposed). The wiring layer 2a is electrically connected to a power supply 5 (as shown in FIG. 1) to carry direct current (DC) signals. In some embodiments, the surface of the dielectric layer 2b away from the wiring layer 2a (e.g., a second surface of the dielectric layer 2b opposite a first surface facing the wiring layer 2a) is fixed to an inner circumferential surface of a lamp tube, for example, by means of an adhesive sheet 4. The portion of the dielectric layer 2b fixed to the inner circumferential surface of the lamp tube 1 may substantially conform to the shape of the inner circumferential surface of the lamp tube 1. The wiring layer 2a can be a metal layer or a power supply layer including wires such as copper wires.

In another embodiment, the outer surface of the wiring layer 2a or the dielectric layer 2b may be covered with a circuit protective layer made of an ink with function of resisting soldering and increasing reflectivity. Alternatively, the dielectric layer can be omitted and the wiring layer can be directly bonded to the inner circumferential surface of the lamp tube, and the outer surface of the wiring layer 2a may be coated with the circuit protective layer. Whether the wiring layer 2a has a one-layered, or two-layered structure, the circuit protective layer can be adopted. In some embodiments, the circuit protective layer is disposed only on one side/surface of the LED light strip 2, such as the surface having the LED light source 202. In some embodiments, the bendable circuit sheet is a one-layered structure made of just one wiring layer 2a, or a two-layered structure made of one wiring layer 2a and one dielectric layer 2b, and thus is more bendable or flexible to curl when compared with the conventional three-layered flexible substrate (one dielectric layer sandwiched with two wiring layers). As a result, the bendable circuit sheet of the LED light strip 2 can be installed in a lamp tube with a customized shape or non-tubular shape, and fitly mounted to the inner surface of the lamp tube. A bendable circuit sheet closely mounted to the inner surface of the lamp tube is desirable in some cases. In addition, using fewer layers of the bendable circuit sheet improves the heat dissipation, lowering the material cost, and is more environmental friendly, and provides the opportunity to increase the flexible effect.

Nevertheless, the bendable circuit sheet is not limited to being one-layered or two-layered; in other embodiments, the bendable circuit sheet may include multiple layers of the wiring layers 2a and multiple layers of the dielectric layers 2b, in which the dielectric layers 2b and the wiring layers 2a are sequentially stacked in a staggered manner, respectively. These stacked layers may be between the outermost wiring layer 2a (with respect to the inner circumferential surface of the lamp tube), which has the LED light source 202 disposed thereon, and the inner circumferential surface of the lamp tube, and may be electrically connected to the power supply 5 (as shown in FIG. 1.) Moreover, in some embodiments, the length of the bendable circuit sheet (e.g, the length along a surface of the bendable circuit sheet from one end of the circuit sheet to a second end of the circuit sheet) is greater than the length of the lamp tube, or at least greater than a central portion of the lamp tube between two transition regions (e.g., where the circumference of the lamp tube narrows) on either end. For example, the length following along the contours of one surface of the bendable circuit sheet (e.g., a top surface of the circuit sheet) may be longer than the length from one terminal end to an opposite terminal end of the lamp tube. Also, a length along a straight line that extends in the same direction as the direction in which the lamp tube extends, from a first end of the bendable circuit sheet to a second, opposite end of the bendable circuit sheet, may be longer than the length along the same straight line of the lamp tube.

Figure 6:
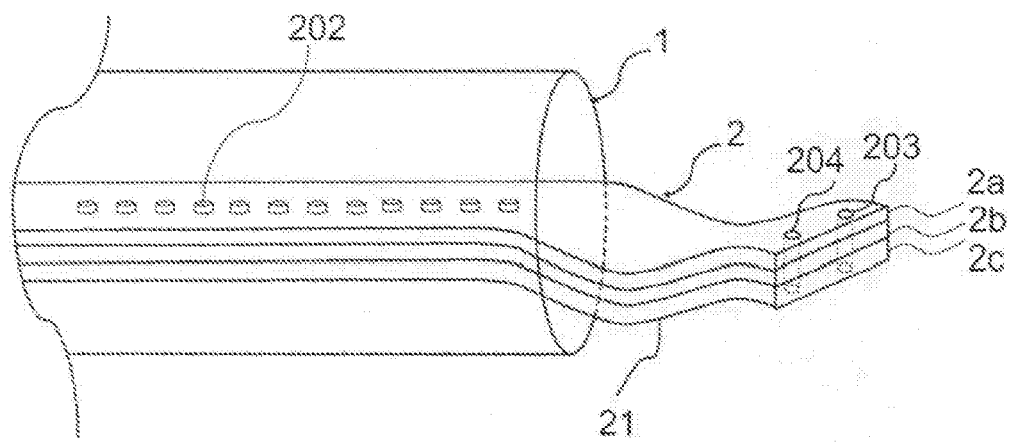
FIG. 6 is a perspective view schematically illustrating a bendable circuit sheet of an LED light strip formed with two conductive wiring layers according to some embodiments.

Referring to FIG. 6, in one embodiment, an LED light strip 2 includes a bendable circuit sheet having in sequence a first wiring layer 2a, a dielectric layer 2b, and a second wiring layer 2c. In one example, the thickness of the second wiring layer 2c (e.g., in a direction in which the layers 2a through 2c are stacked) is greater than that of the first wiring layer 2a, and the length of the LED light strip 2 is greater than that of a lamp tube 1, or at least greater than a central portion of the lamp tube between two transition regions (e.g., where the circumference of the lamp tube narrows) on either end. The end region of the LED light strip 2 extending beyond the end portion of the lamp tube 1 without having a light source 202 disposed thereon is formed with two separate through holes 203 and 204 to respectively electrically communicate the first wiring layer 2a and the second wiring layer 2c. The through holes 203 and 204 are not in communication with each other to avoid short.

In this way, the greater thickness of the second wiring layer 2c allows the second wiring layer 2c to support the first wiring layer 2a and the dielectric layer 2b, and meanwhile allows the LED light strip 2 to be mounted onto the inner circumferential surface without being liable to shift or deform, and thus the yield rate of product can be improved. In addition, the first wiring layer 2a and the second wiring layer 2c are in electrical communication such that the circuit layout of the first wiring later 2a can be extended downward to the second wiring layer 2c to reach the circuit layout of the entire LED light strip 2. Moreover, since the circuit layout becomes two-layered, the area of each single layer and therefore the width of the LED light strip 2 can be reduced such that more LED light strips 2 can be put on a production line to increase productivity.

Furthermore, in some embodiments, the first wiring layer 2a and the second wiring layer 2c of the end region of the LED light strip 2 that extends beyond the end portion of the lamp tube 1 without disposition of the light source 202 can be used to accomplish the circuit layout of a power supply module so that the power supply module can be directly disposed on the bendable circuit sheet of the LED light strip 2.

In a case where two ends of the LED light strip 2 are detached from the inner surface of the lamp tube 1 and where the LED light strip 2 is connected to the power supply 5 via wire-bonding, certain movements in subsequent transportation are likely to cause the bonded wires to break. Therefore, a desirable option for the connection between the LED light strip 2 and the power supply 5 (as shown in FIG. 1) could be soldering. Specifically, referring to FIG. 1, the ends of the LED light strip 2 including the bendable circuit sheet are arranged to pass over the strengthened transition region of a lamp tube, and to be directly solder bonded to an output terminal of the power supply 5. This may improve product quality by avoiding using wires and/or wire bonding. As discussed herein, a transition region of the lamp tube refers to regions outside a central portion of the lamp tube and inside terminal ends of the lamp tube. For example, a central portion of the lamp tube may have a constant diameter, and each transition region between the central portion and a terminal end of the lamp tube may have a changing diameter (e.g., at least part of the transition region may become more narrow moving in a direction from the central portion to the terminal end of the lamp tube).

Figure 3:
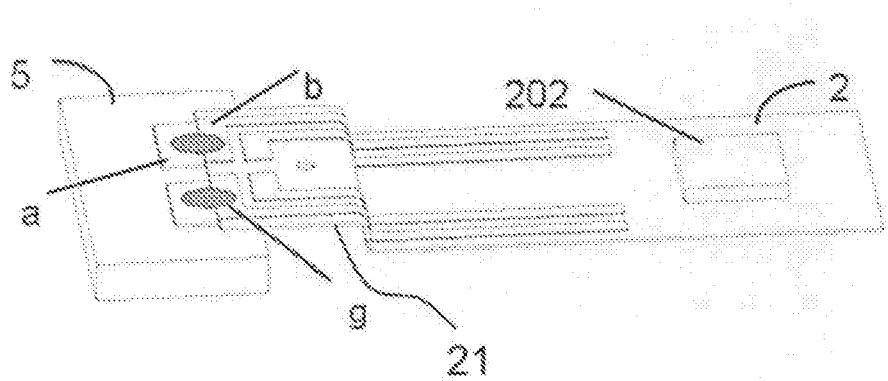
FIG. 3 is a perspective view schematically illustrating a soldering pad of a bendable circuit sheet of an LED light strip for a solder connection with a power supply of an LED tube lamp according to some embodiments.

Referring to FIG. 3, an output terminal of a printed circuit board of the power supply 5 may have soldering pads "a" (as shown in FIG. 1 as well) provided with an amount of solder (e.g., tin solder) with a thickness sufficient to later form a solder joint "g" (or a solder ball "g"). Correspondingly, the ends of the LED light strip 2 may have soldering pads "b" (as shown in FIG. 1 as well). The soldering pads "a" on the output terminal of the printed circuit board of the power supply 5 are soldered to the soldering pads "b" on the LED light strip 2 via the tin solder on the soldering pads "a". The soldering pads "a" and the soldering pads "b" may be face to face during soldering such that the connection between the LED light strip 2 and the printed circuit board of the power supply 5 is the most firm. However, this kind of soldering typically includes a thermo-compression head pressing on the rear surface of the LED light strip 2 and heating the tin solder, i.e. the LED light strip 2 intervenes between the thermo-compression head and the tin solder, and therefore may cause reliability problems. In some embodiments, a through hole may be formed in each of the soldering pads "b" on the LED light strip 2 to allow the soldering pads "b" to overlay the soldering pads "a" without being face-to-face (e.g., both soldering pads "a" and soldering pads "b" can have exposed surfaces that face the same direction) and the thermo-compression head directly presses tin solders on the soldering pads "a" on surface of the printed circuit board of the power supply 5 when the soldering pads "a" and the soldering pads "b" are vertically aligned. This example provides a simple process for manufacturing.

Referring again to FIG. 3, two ends of the LED light strip 2 detached from the inner surface of the lamp tube 1 (as shown in FIG. 6) are formed as freely extending portions 21 (as shown in FIGS. 1 and 6 as well), while most of the LED light strip 2 is attached and secured to the inner surface of the lamp tube. One of the freely extending portions 21 has the soldering pads "b" as mentioned above. Upon assembling of the LED tube lamp, the freely extending end portions 21 along with the soldered connection of the printed circuit board of the power supply 5 and the LED light strip 2 would be coiled, curled up or deformed to be fittingly accommodated inside the lamp tube as shown in FIG. 1. When the bendable circuit sheet of the LED light strip 2 includes in sequence the first wiring layer 2a, the dielectric layer 2b, and the second wiring layer 2c as shown in FIG. 6, the freely extending end portions 21, which are the end regions of the LED light strip 2 extending beyond the lamp tube without disposition of the light sources 202, can be used to accomplish the connection between the first wiring layer 2a and the second wiring layer 2c and arrange the circuit layout of the power supply 5. As described above, the freely extending portions 21 may be different from a fixed portion of the LED light strip 2 in that the fixed portion may conform to the shape of the inner surface of the lamp tube and may be fixed thereto, while the freely extending portion 21 may have a shape that does not conform to the shape of the lamp tube. As shown in FIG. 1, the freely extending portion 21 may be bent away from the lamp tube. For example, there may be a space between an inner surface of the lamp tube and the freely extending portion 21.

Figure 4:
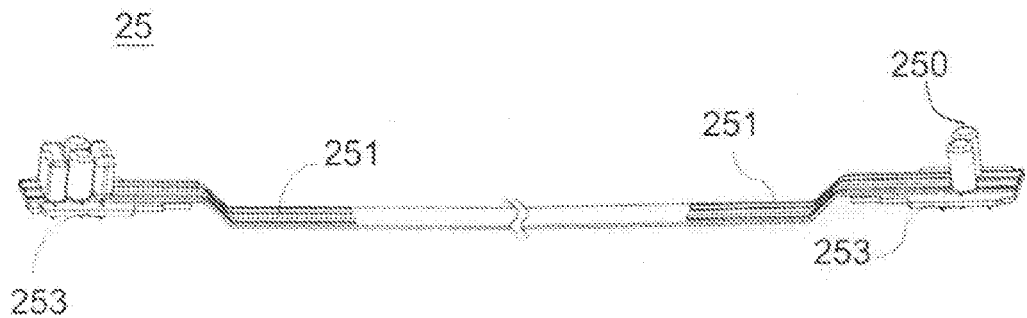
FIG. 4 is a perspective view schematically illustrating a circuit board assembly composed of a bendable circuit sheet of an LED light strip and a printed circuit board of a power supply according to some embodiments.
Figure 5:
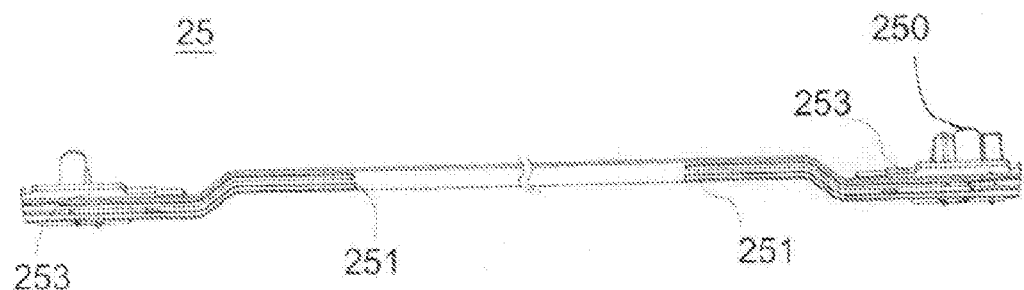
FIG. 5 is a perspective view schematically illustrating another arrangement of a circuit board assembly, according to some embodiments.

Referring to FIGS. 4 and 5, in another embodiment, the LED light strip and the power supply may be connected by utilizing a circuit board assembly 25 configured with a power supply module 250 instead of solder bonding as described previously. The circuit board assembly 25 has a long circuit sheet 251 and a short circuit board 253 that are adhered to each other with the short circuit board 253 being adjacent to the side edge of the long circuit sheet 251. The short circuit board 253 may be provided with the power supply module 250 to form the power supply 5. The short circuit board 253 is stiffer or more rigid than the long circuit sheet 251 to be able to support the power supply module 250.

The long circuit sheet 251 may be the bendable circuit sheet of the LED light strip 2 including a wiring layer 2a as shown in FIG. 2. The wiring layer 2a of the LED light strip 2 and the power supply module 250 may be electrically connected in various manners depending on the demand in practice. As shown in FIG. 4, the power supply module 250 and the long circuit sheet 251 having the wiring layer 2a on surface are on the same side of the short circuit board 253 such that the power supply module 250 is directly connected to the long circuit sheet 251. As shown in FIG. 5, alternatively, the power supply module 250 and the long circuit sheet 251 including the wiring layer 2a on surface are on opposite sides of the short circuit board 253 such that the power supply module 250 is directly connected to the short circuit board 253 and indirectly connected to the wiring layer 2a of the LED light strip 2 by way of the short circuit board 253.

The power supply module 250 and power supply 5 described above may include various elements for providing power to the LED light strip 2. For example, they may include power converters or other circuit elements for providing power to the LED light strip 2.

Figure 7A:
FIG. 7A is a block diagram of an exemplary power supply system for an LED tube lamp according to some embodiments.

FIG. 7A is a block diagram of a system including an LED tube lamp including a power supply system according to certain embodiments. Referring to FIG. 7A, an alternating current (AC) power supply 508 is used to supply an AC supply signal, and may be an AC powerline with a voltage rating, for example, in 100-277V and a frequency rating, for example, of 50 Hz or 60 Hz. A lamp driving circuit 505 receives the AC supply signal from the AC power supply 508 and then converts it into an AC driving signal. In some embodiments, the power supply 508 and the lamp driving circuit 505 are outside of the LED tube lamp. For example, the lamp driving circuit 505 may be part of a socket into which the LED tube lamp is inserted. The lamp driving circuit 505 could be an electronic ballast and is used to convert the signal of commercial electricity into high-frequency and high-voltage AC driving signal. The common types of electronic ballast, such as instant-start electronic ballast, program-start electronic ballast, and rapid-start electronic ballast, can be applied to the LED tube lamp. In some embodiments, the voltage of the AC driving signal is bigger than 300V and prefers 400-700V with frequency being higher than 10 kHz and preferring 20-50 kHz. An LED tube lamp 500 receives the AC driving signal from the lamp driving circuit 505 and is thus driven to emit light. In the present embodiment, the LED tube lamp 500 is in a driving environment in which it is power-supplied at its one end cap having two conductive pins 501 and 502, which are used to receive the AC driving signal. The two pins 501 and 502 may be electrically coupled to, either directly or indirectly, the lamp driving circuit 505. In some embodiments, the LED tube lamp is power-supplied at its both end caps respectively having two conductive pins, which are coupled to the lamp driving circuit to concurrently receive the AC driving signal. However, in certain embodiments, each end cap of the LED tube lamp could have only one conductive pin for receiving the AC driving signal. For example, it may not be necessary to have two conductive pins used in each end cap for the purpose of passing electricity through the both ends of the LED tube lamp.

In some embodiments, lamp driving circuit 505 may be omitted and it is therefore depicted by a dotted line. In certain embodiments, if the lamp driving circuit 505 is omitted, the AC power supply 508 is directly coupled to the pins 501 and 502, which then receive the AC supply signal as the AC driving signal.

Figure 7B:
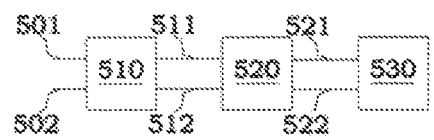
FIG. 7B is a block diagram of an exemplary LED lamp according to some embodiments.

FIG. 7B is a block diagram showing elements of an LED lamp according to one embodiment. Referring to FIG. 7B, the power supply module of the LED lamp includes a rectifying circuit 510, and a filtering circuit 520, and may further include some parts of an LED lighting module 530. The rectifying circuit 510 is coupled to two pins 501 and 502 to receive and then rectify an external driving signal, so as to output a rectified signal at two rectifying output terminals 511 and 512. The external driving signal may be the AC driving signal or the AC supply signal described with reference to FIG. 7A, or may be a direct current (DC) signal, which in some embodiments does not alter the LED tube lamp. The filtering circuit 520 is coupled to the rectifying circuit for filtering the rectified signal to produce a filtered signal. For instance, in some embodiments, the filtering circuit 520 is coupled to the rectifying output terminals 511 and 512 to receive and then filter the rectified signal, so as to output a filtered signal at two filtering output terminals 521 and 522. The LED lighting module 530 is coupled to the filtering circuit 520 to receive the filtered signal for emitting light. For instance, the LED lighting module 530 may include a circuit coupled to the filtering output terminals 521 and 522 to receive the filtered signal and thereby to drive an LED unit (not shown) in LED lighting module 530 to emit light. Details of these operations are described in below descriptions of certain embodiments.

Although there are two rectifying output terminals 511 and 512 and two filtering output terminals 521 and 522 in certain embodiments of these figures, in practice the number of ports or terminals for coupling between the rectifying circuit 510, the filtering circuit 520, and the LED lighting module 530 may be one or more depending on the needs of signal transmission between the circuits or devices.

In addition, the power supply module of the LED lamp described in FIG. 7B, and embodiments of the power supply module of an LED lamp described below, may each be used in the LED tube lamp 500 in FIG. 7A, and may also be used in any other type of LED lighting structure having two conductive pins used to conduct power, such as LED light bulbs, personal area lights (PAL), plug-in LED lamps with different types of bases (such as types of PL-S, PL-D, PL-T, PL-L, etc.), etc.

Figure 8:
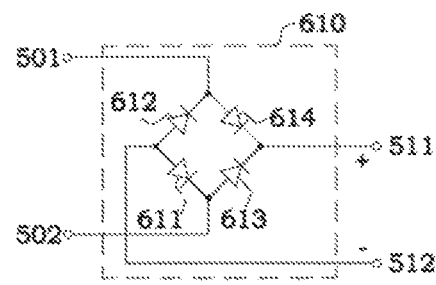
FIG. 8 is a schematic diagram of a rectifying circuit according to some embodiments.

FIG. 8 is a schematic diagram of a rectifying circuit according to an embodiment. Referring to FIG. 8, a rectifying circuit 610, i.e. a bridge rectifier, includes four rectifying diodes 611, 612, 613, and 614, configured to full-wave rectify a received signal. The diode 611 has an anode connected to the output terminal 512, and a cathode connected to the pin 502. The diode 612 has an anode connected to the output terminal 512, and a cathode connected to the pin 501. The diode 613 has an anode connected to the pin 502, and a cathode connected to the output terminal 511. The diode 614 has an anode connected to the pin 501, and a cathode connected to the output terminal 511.

When the pins 501 and 502 (generally referred to as terminals) receive an AC signal, the rectifying circuit 610 operates as follows. During the connected AC signal's positive half cycle, the AC signal is input through the pin 501, the diode 614, and the output terminal 511 in sequence, and later output through the output terminal 512, the diode 611, and the pin 502 in sequence. During the connected AC signal's negative half cycle, the AC signal is input through the pin 502, the diode 613, and the output terminal 511 in sequence, and later output through the output terminal 512, the diode 612, and the pin 501 in sequence. Therefore, during the connected AC signal's full cycle, the positive pole of the rectified signal produced by the rectifying circuit 610 keeps at the output terminal 511, and the negative pole of the rectified signal remains at the output terminal 512. Accordingly, the rectified signal produced or output by the rectifying circuit 610 is a full-wave rectified signal.

When the pins 501 and 502 are coupled to a DC power supply to receive a DC signal, the rectifying circuit 610 operates as follows. When the pin 501 is coupled to the positive end of the DC power supply and the pin 502 to the negative end of the DC power supply, the DC signal is input through the pin 501, the diode 614, and the output terminal 511 in sequence, and later output through the output terminal 512, the diode 611, and the pin 502 in sequence. When the pin 501 is coupled to the negative end of the DC power supply and the pin 502 to the positive end of the DC power supply, the DC signal is input through the pin 502, the diode 613, and the output terminal 511 in sequence, and later output through the output terminal 512, the diode 612, and the pin 501 in sequence. Therefore, no matter what the electrical polarity of the DC signal is between the pins 501 and 502, the positive pole of the rectified signal produced by the rectifying circuit 610 keeps at the output terminal 511, and the negative pole of the rectified signal remains at the output terminal 512.

Therefore, the rectifying circuit 610 in this embodiment can output or produce a proper rectified signal regardless of whether the received input signal is an AC or DC signal.

Figure 9A:
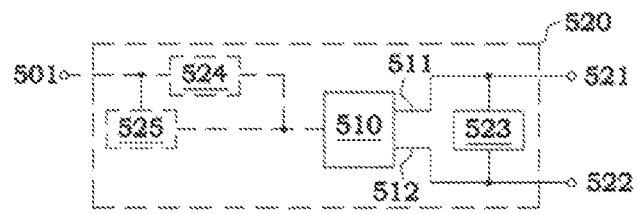
FIG. 9A-9C are block diagrams of exemplary filtering circuits according to some embodiments.

FIG. 9A is a block diagram of the filtering circuit according to an embodiment. A rectifying circuit 510 is shown in FIG. 9A for illustrating its connection with other components, without intending a filtering circuit 520 to include the rectifying circuit 510. Referring to FIG. 9A, the filtering circuit 520 includes a filtering unit 523 coupled to two rectifying output terminals 511 and 512 to receive and to filter out ripples of a rectified signal from the rectifying circuit 510. Accordingly, the waveform of a filtered signal is smoother than that of the rectified signal. The filtering circuit 520 may further include another filtering unit 524 coupled between a rectifying circuit and a pin correspondingly, for example, between the rectifying circuit 510 and the pin 501, the rectifying circuit 510 and the pin 502, the rectifying circuit 540 and the pin 503, and/or the rectifying circuit 540 and the pin 504. The filtering unit 524 is used to filter a specific frequency, for example, to filter out a specific frequency of an external driving signal. In this embodiment, the filtering unit 524 is coupled between the rectifying circuit 510 and the pin 501. The filtering circuit 520 may further include another filtering unit 525 coupled between one of the pins 501 and 502 and one of the diodes of the rectifying circuit 510, or between one of the pins 503 and 504 and one of the diodes of the rectifying circuit 540 to reduce or filter out electromagnetic interference (EMI). In this embodiment, the filtering unit 525 is coupled between the pin 501 and one of diodes of the rectifying circuit 510 (not shown in FIG. 9A). Since the filtering units 524 and 525 may be present or omitted depending on actual circumstances of their uses, they are depicted by a dotted line in FIG. 9A. Filtering units 523, 524, and 525 may be referred to herein as filtering sub-circuits of filtering circuit 520, or may be generally referred to as a filtering circuit.

Figure 9B:
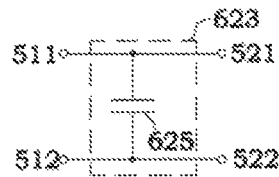

FIG. 9B is a schematic diagram of a filtering unit according to one embodiment. Referring to FIG. 9B, a filtering unit 623 includes a capacitor 625 having an end coupled to the output terminal 511 and a filtering output terminal 521 and the other end thereof coupled to the output terminal 512 and a filtering output terminal 522, and is configured to low-pass filter a rectified signal from the output terminals 511 and 512, so as to filter out high-frequency components of the rectified signal and thereby output a filtered signal at the filtering output terminals 521 and 522.

Figure 9C:
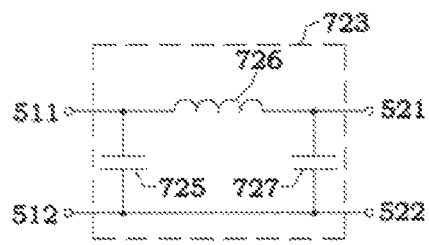

FIG. 9C is a schematic diagram of a filtering unit according to one embodiment. Referring to FIG. 9C, a filtering unit 723 includes a pi filter circuit including a capacitor 725, an inductor 726, and a capacitor 727. As is well known, a pi filter circuit looks like the symbol π in its shape or structure. The capacitor 725 has an end connected to the output terminal 511 and coupled to the filtering output terminal 521 through the inductor 726, and has another end connected to the output terminal 512 and the filtering output terminal 522. The inductor 726 is coupled between output terminal 511 and the filtering output terminal 521. The capacitor 727 has an end connected to the filtering output terminal 521 and coupled to the output terminal 511 through the inductor 726, and has another end connected to the output terminal 512 and the filtering output terminal 522.

As seen between the output terminals 511 and 512 and the filtering output terminals 521 and 522, the filtering unit 723 compared to the filtering unit 623 in FIG. 9B additionally has an inductor 726 and a capacitor 727, which perform the function of low-pass filtering like the capacitor 725 does. Therefore, the filtering unit 723 in this embodiment compared to the filtering unit 623 in FIG. 9B has a better ability to filter out high-frequency components to output a filtered signal with a smoother waveform.

The inductance values of the inductor 726 in the embodiments mentioned above are chosen in the range of, for example in some embodiments, about 10 nH to 10 mH. And the capacitance values of the capacitors 625, 725, and 727 in the embodiments stated above are chosen in the range of, for example in some embodiments, about 100 pF to 1 uF.

Figure 10A:
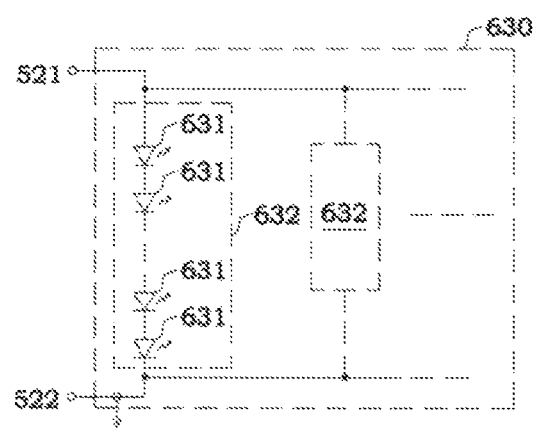
FIG. 10A-10B are schematic diagrams of exemplary LED modules according to some embodiments.

FIG. 10A is a schematic diagram of an LED module according to one embodiment. Referring to FIG. 10A, an LED module 630 has an anode connected to a filtering output terminal 521, a cathode connected to a filtering output terminal 522, and includes at least one LED unit 632, such as the light source mentioned above. When two or more LED units are included, they are connected in parallel. An anode of each LED unit 632 forms the anode of LED module 630 and is connected to filtering output terminal 521, and the cathode of each LED unit 632 forms the cathode of LED module 630 and is connected to the filtering output terminal 522. Each LED unit 632 includes at least one LED 631. When multiple LEDs 631 are included in an LED unit 632, they are connected in series with the anode of the first LED 631 forming the anode of the LED unit 632 that it is a part of and the cathode of the first LED 631 connected to the next or second LED 631. And the anode of the last LED 631 in this LED unit 632 is connected to the cathode of a previous LED 631 and the cathode of the last LED 631 forming the cathode of the LED unit 632 that it is a part of.

According to certain embodiments, LED module 630 may produce a current detection signal S531 reflecting the magnitude of current through the LED module 630 and being used for controlling or detecting current on the LED module 630. As described herein, an LED unit may refer to a single string of LEDs arranged in series, and an LED module may refer to a single LED unit, or a plurality of LED units connected to a same two nodes (e.g., arranged in parallel). For example, the LED light strip 2 described above may be an LED module and/or LED unit.

Figure 10B:
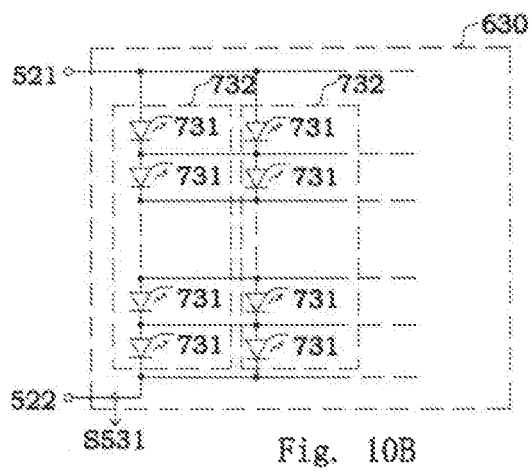

FIG. 10B is a schematic diagram of an LED module according to one embodiment. Referring to FIG. 10B, an LED module 630 has an anode connected to a filtering output terminal 521, a cathode connected to a filtering output terminal 522, and includes at least two LED units 732 with the anode of each LED unit 732 forming the anode of LED module 630 and the cathode of each LED unit 732 forming the cathode of LED module 630. Each LED unit 732 includes at least two LEDs 731 connected in the same way as those described in FIG. 10A. For example, the anode of the first LED 731 in an LED unit 732 forms the anode of the LED unit 732 that it is a part of, the cathode of the first LED 731 is connected to the anode of the next or second LED 731, and the cathode of the last LED 731 forms the cathode of the LED unit 732 that it is a part of. Further, LED units 732 in an LED module 630 are connected to each other in this embodiment. All of the n-th LEDs 731 in the related LED units 732 thereof are connected by their anodes and cathodes, such as those shown in FIG. 10B but not limit to, where n is a positive integer. In this way, the LEDs in the LED module 630 of this embodiment are connected in the form of a mesh.

Compared to the embodiments of FIGS. 11A-11F, the LED lighting module 530 in the above embodiments includes the LED module 630, but doesn't include a driving circuit for the LED module 630.

Also, the LED module 630 in this embodiment may produce a current detection signal S531 reflecting the magnitude of current through the LED module 630 and being used for controlling or detecting the LED module 630.

The number of LEDs 731 included by an LED unit 732 in some embodiments is in the range of 15-25, and may be in some embodiments in the range of 18-22.

Figure 10C:
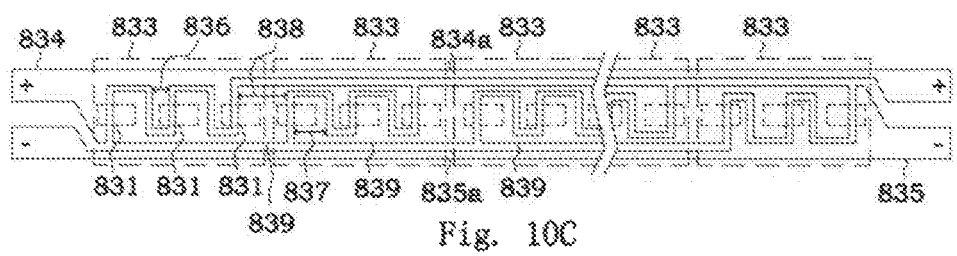
FIG. 10C-10E are plan views of a circuit layout of an LED module according to some embodiments.

FIG. 10C is a plan view of an exemplary circuit layout of an LED module according to one embodiment. Referring to FIG. 10C, in this embodiment, multiple LEDs 831 are connected in the same way as described in FIG. 10B, and three LED units are assumed in the LED module 630 and described as follows for illustration. A positive conductive line 834 and a negative conductive line 835 are to receive a driving signal for supplying power to the LEDs 831. For example, the positive conductive line 834 may be coupled to the filtering output terminal 521 of the filtering circuit 520 described above, and the negative conductive line 835 coupled to the filtering output terminal 522 of the filtering circuit 520 to receive a filtered signal. For the convenience of illustration, all three of the n-th LEDs 831 in the three related LED units thereof are grouped as an LED set 833 in FIG. 10C.

The positive conductive line 834 connects the three first LEDs 831 of the leftmost three related LED units thereof, for example, connects the anodes on the left sides of the three first LEDs 831 as shown in the leftmost LED set 833 of FIG. 10C. The negative conductive line 835 connects the three last LEDs 831 of the rightmost three corresponding LED units thereof, for example, connects the cathodes on the right sides of the three last LEDs 831 as shown in the rightmost LED set 833 of FIG. 10C. The cathodes of the three first LEDs 831, the anodes of the three last LEDs 831, and the anodes and cathodes of all the remaining LEDs 831 are connected by conductive lines or parts 839, also referred to as internal conductive connectors.

For example, the anodes of the three LEDs 831 in the leftmost LED set 833 may be connected together by the positive conductive line 834, and their cathodes may be connected together by a leftmost conductive part 839. The anodes of the three LEDs 831 in the second leftmost LED set 833 are also connected together by the leftmost conductive part 839, whereas their cathodes are connected together by a second, next-leftmost conductive part 839. Since the cathodes of the three LEDs 831 in the leftmost LED set 833 and the anodes of the three LEDs 831 in the second next-leftmost LED set 833 are connected together by the same leftmost conductive part 839, the cathode of the first LED 831 in each of the three LED units is connected to the anode of the next or second LED 831. The remaining LEDs 831 are also connected in the same way. Accordingly, all the LEDs 831 of the three LED units are connected to form the mesh as shown in FIG. 10B. The LED module shown in FIG. 10C may form an LED light strip 2 such as described above.

In the embodiment shown in FIG. 10C, the length 836 (e.g., length along a first direction that is a length direction of the LED light strip 2 and lamp tube) of a portion of each conductive part 839 that connects to the anode of an LED 831 is smaller than the length 837 of another portion of each conductive part 839 that connects to the cathode of an LED 831. This makes the area of the latter portion connecting to the cathode larger than that of the former portion connecting to the anode. Moreover, the length 837 may be smaller than a length 838 of a portion of each conductive part 839 that connects the cathode of an LED 831 and the anode of the next LED 831 in two adjacent LED sets 833. This makes the area of the portion of each conductive part 839 that connects a cathode and an anode larger than the area of any other portion of each conductive part 839 that connects to only a cathode or an anode of an LED 831. Due to the length differences and area differences, this layout structure improves heat dissipation of the LEDs 831.

In some embodiments, the positive conductive line 834 includes a lengthwise portion 834a, and the negative conductive line 835 includes a lengthwise portion 835a, which are conducive to make the LED module have a positive "+" connective portion and a negative "−" connective portion at each of the two ends of the LED module, as shown in FIG. 10C. Such a layout structure allows for coupling certain of the various circuits of the power supply module of the LED lamp, including e.g. the filtering circuit 520 and the rectifying circuits 510 and 540, to the LED module through the positive connective portion and/or the negative connective portion at each or both ends of the LED lamp. Thus the layout structure increases the flexibility in arranging actual circuits in the LED lamp.

Figure 10D:

FIG. 10D is a plan view of a circuit layout of the LED module according to another embodiment. Referring to FIG. 10D, in this embodiment, multiple LEDs 931 are connected in the same way as described in FIG. 10A, and three LED units each including 7 LEDs 931 are assumed in the LED module 630 and described as follows for illustration. A positive conductive line 934 and a negative conductive line 935 are to receive a driving signal for supplying power to the LEDs 931. For example, the positive conductive line 934 may be coupled to the filtering output terminal 521 of the filtering circuit 520 described above, and the negative conductive line 935 is coupled to the filtering output terminal 522 of the filtering circuit 520, so as to receive a filtered signal. For the convenience of illustration, all seven LEDs 931 of each of the three LED units are grouped as an LED set 932 in FIG. 10D. Thus there are three LED sets 932 corresponding to the three LED units.

The positive conductive line 934 connects the anode on the left side of the first or leftmost LED 931 of each of the three LED sets 932. The negative conductive line 935 connects the cathode on the right side of the last or rightmost LED 931 of each of the three LED sets 932. In each LED set 932 of each two adjacent LEDs 931, the LED 931 on the left has a cathode connected by a conductive part 939 to an anode of the LED 931 on the right. By such a layout, the LEDs 931 of each LED set 932 are connected in series.

In some embodiments, the conductive part 939 may be used to connect an anode and a cathode of two consecutive LEDs 931 respectively. The negative conductive line 935 connects the cathode of the last or rightmost LED 931 of each of the three LED sets 932. And the positive conductive line 934 connects the anode of the first or leftmost LED 931 of each of the three LED sets 932. Therefore, as shown in FIG. 10D, the length of the conductive part 939 is larger than that of the portion of negative conductive line 935 connecting to a cathode, which length is then larger than that of the portion of positive conductive line 934 connecting to an anode. For example, the length 938 of the conductive part 939 may be larger than the length 937 of the portion of negative conductive line 935 connecting a cathode of an LED 931, which length 937 is then larger than the length 936 of the portion of the positive conductive line 934 connecting an anode of an LED 931. Such a layout structure improves heat dissipation of the LEDs 931 in LED module 630.

The positive conductive line 934 may include a lengthwise portion 934a, and the negative conductive line 935 may include a lengthwise portion 935a, which are conducive to make the LED module have a positive "+" connective portion and a negative "−" connective portion at each of the two ends of the LED module, as shown in FIG. 10D. Such a layout structure allows for coupling certain of the various circuits of the power supply module of the LED lamp, including e.g. the filtering circuit 520 and the rectifying circuits 510 and 540, to the LED module through the positive connective portion 934a and/or the negative connective portion 935a at each or both ends of the LED lamp.

The positive conductive lines (834 or 934) may be characterized as including two end terminals at opposite ends, a plurality of pads between the two end terminals and for contacting and/or supplying power to LEDs (e.g., anodes of LEDs), and a wire portion, which may be an elongated conducive line extending along a length of an LED light strip and electrically connecting the two end terminals to the plurality of pads. Similarly, the negative conductive lines (835 or 935) may be characterized as including two end terminals at opposite ends, a plurality of pads between the two end terminals and for contacting and/or supplying power to LEDs (e.g., cathodes of LEDs), and a wire portion, which may be an elongated conducive line extending along a length of an LED light strip and electrically connecting the two end terminals to the plurality of pads. Thus the layout structures shown above increase the flexibility in arranging actual circuits in the LED lamp.

Further, the circuit layouts as shown in FIGS. 10C and 10D may be implemented with a bendable circuit sheet or substrate, which may be a flexible circuit board. The circuit layouts may be implemented for one of the exemplary LED light strips described previously, for example, to serve as a circuit board or sheet for the LED light strip on which the LED light sources are disposed. For example, the bendable circuit sheet may comprise one conductive layer where the positive conductive line 834 including the positive lengthwise portion 834a, the negative conductive line 835 including the negative lengthwise portion 835a, and the conductive parts 839 shown in FIG. 10C, and the positive conductive line 934 including the positive lengthwise portion 934a, the negative conductive line 935 including the negative lengthwise portion 935a, and the conductive parts 939 shown in FIG. 10D are formed. For example, the different conductive patterns may be formed by an etching method.

Figure 10E:
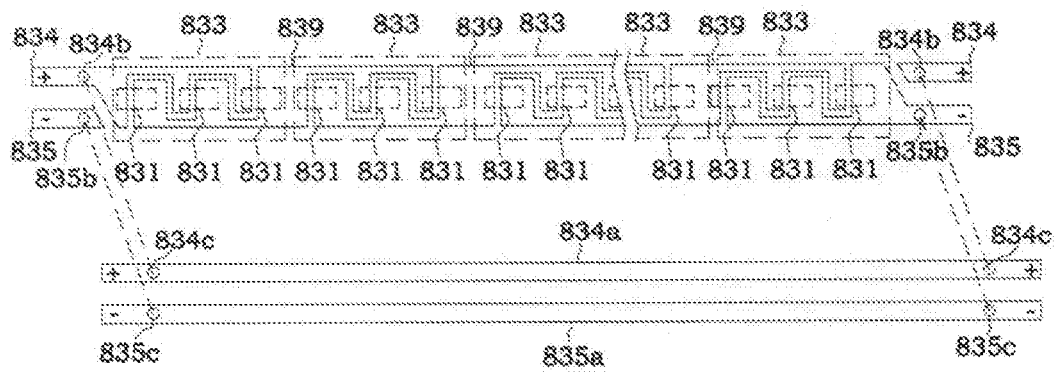

FIG. 10E is a plan view of a circuit layout of an LED module according to another embodiment. The layout structures of the LED module in FIGS. 10E and 10C correspond to the same way of connecting the LEDs 831 as those shown in FIG. 10B, but the layout structure in FIG. 10E comprises two conductive layers instead of only one conductive layer for forming the circuit layout as shown in FIG. 10C. Referring to FIG. 10E, the main difference from the layout in FIG. 10C is that the positive conductive line 834 and the negative conductive line 835 have a lengthwise portion 834a and a lengthwise portion 835a, respectively, that are formed in a second conductive layer instead. This type of structure may be used to implement the embodiments that include two conductive layers such as discussed previously (e.g., as described in connection with FIG. 6). The difference is elaborated as follows.

Referring to FIGS. 10E and 6, the bendable circuit sheet of the LED module comprises a first conductive layer 2a and a second conductive layer 2c electrically insulated from each other by a dielectric layer 2b (not shown). Of the two conductive layers, the positive conductive line 834, the negative conductive line 835, and the conductive parts 839 in FIG. 10E are formed in first conductive layer 2a by the method of etching for electrically connecting the plurality of LED components 831 e.g. in a form of a mesh, whereas the positive lengthwise portion 834a and the negative lengthwise portion 835a are formed in second conductive layer 2c (e.g., by etching) for electrically connecting (e.g., the filtering output terminal of) the filtering circuit. Further, the positive conductive line 834 and the negative conductive line 835 in the first conductive layer 2a have via points 834b and via points 835b, respectively, for connecting to second conductive layer 2c. And the positive lengthwise portion 834a and the negative lengthwise portion 835a in second conductive layer 2c have via points 834c and via points 835c, respectively. The via points 834b are positioned corresponding to the via points 834c, for connecting the positive conductive line 834 and the positive lengthwise portion 834a. The via points 835b are positioned corresponding to the via points 835c, for connecting the negative conductive line 835 and the negative lengthwise portion 835a. An exemplary desirable way of connecting the two conductive layers is to form a hole connecting each via point 834b and a corresponding via point 834c, and to form a hole connecting each via point 835b and a corresponding via point 835c, with the holes extending through the two conductive layers and the dielectric layer in-between. Positive conductive line

834 and the positive lengthwise portion 834a can be electrically connected, for example, by welding metallic part(s) through the connecting hole(s), and the negative conductive line 835 and the negative lengthwise portion 835a can be electrically connected, for example, by welding metallic part(s) through the connecting hole(s).

Similarly, the layout structure of the LED module in FIG. 10D may alternatively have the positive lengthwise portion 934a and the negative lengthwise portion 935a disposed in a second conductive layer to constitute a two-layered layout structure.

It's worth noting that the thickness of the second conductive layer of a two-layered bendable circuit sheet is, in some embodiments, larger than that of the first conductive layer in order to reduce the voltage drop or loss along each of the positive lengthwise portion and the negative lengthwise portion disposed in the second conductive layer. Compared to a one-layered bendable circuit sheet, since a positive lengthwise portion and a negative lengthwise portion are disposed in a second conductive layer in a two-layer bendable circuit sheet, the width (between two lengthwise sides) of the two-layered bendable circuit sheet is or can be reduced. On the same fixture or plate in a production process, the maximum number of bendable circuit sheets each with a shorter width that can be laid together is larger than the maximum number of bendable circuit sheets each with a longer width that can be laid together. Thus adopting a bendable circuit sheet with a shorter width can increase the efficiency of production of the LED module. And reliability in the production process, such as the accuracy of welding position when welding (materials on) the LED components, can also be improved, because a two-layer bendable circuit sheet can better maintain its shape.

As a variant of the above embodiments, an exemplary LED tube lamp may have at least some of the electronic components of its power supply module disposed on a light strip of the LED tube lamp. For example, the technique of printed electronic circuit (PEC) can be used to print, insert, or embed at least some of the electronic components onto the LED light strip (e.g., as opposed to being on a separate circuit board connected to the LED light strip).

In one embodiment, all electronic components of the power supply module are disposed directly on the LED light strip. For example, the production process may include or proceed with the following steps: preparation of the circuit substrate (e.g. preparation of a flexible printed circuit board); ink jet printing of metallic nano-ink; ink jet printing of active and passive components (as of the power supply module); drying/sintering; ink jet printing of interlayer bumps; spraying of insulating ink; ink jet printing of metallic nano-ink; ink jet printing of active and passive components (to sequentially form the included layers); spraying of surface bond pad(s); and spraying of solder resist against LED components. The production process may be different, however, and still result in some or all electronic components of the power supply module being disposed directly on the LED light strip.

In certain embodiments, if all electronic components of the power supply module are disposed on the LED light strip, electrical connection between the terminal pins of the LED tube lamp and the light strip may be achieved by connecting the pins to conductive lines which are welded with ends of the light strip. In this case, another substrate for supporting the power supply module is not required, thereby allowing an improved design or arrangement in the end cap(s) of the LED tube lamp. In some embodiments, (components of) the power supply module are disposed at two ends of the light strip, in order to significantly reduce the impact of heat generated from the power supply module's operations on the LED components. Since no substrate other than the light strip is used to support the power supply module in this case, the total amount of welding or soldering can be significantly reduced, improving the general reliability of the power supply module. If no additional substrate is used, the electronic components of the power supply module disposed on the light strip may still be positioned in the end caps of the LED tube lamp, or they may be positioned partly or wholly inside the lamp tube but not in the end caps Another case is that some of all electronic components of the power supply module, such as some resistors and/or smaller size capacitors, are printed onto the light strip, and some bigger size components, such as some inductors and/or electrolytic capacitors, are disposed on another substrate, for example in the end cap(s). The production process of the light strip in this case may be the same as that described above. And in this case disposing some of all electronic components on the light strip is conducive to achieving a reasonable layout of the power supply module in the LED tube lamp, which may allow of an improved design in the end cap(s).

As a variant embodiment of the above, electronic components of the power supply module may be disposed on the LED light strip by a method of embedding or inserting, e.g. by embedding the components onto a bendable or flexible light strip. In some embodiments, this embedding may be realized by a method using copper-clad laminates (CCL) for forming a resistor or capacitor; a method using ink related to silkscreen printing; or a method of ink jet printing to embed passive components, wherein an ink jet printer is used to directly print inks to constitute passive components and related functionalities to intended positions on the light strip. Then through treatment by ultraviolet (UV) light or drying/sintering, the light strip is formed where passive components are embedded. The electronic components embedded onto the light strip include for example resistors, capacitors, and inductors. In other embodiments, active components also may be embedded. Through embedding some components onto the light strip, a reasonable layout of the power supply module can be achieved to allow of an improved design in the end cap(s), because the surface area on a printed circuit board used for carrying components of the power supply module is reduced or smaller, and as a result the size, weight, and thickness of the resulting printed circuit board for carrying components of the power supply module is also smaller or reduced. Also in this situation since welding points on the printed circuit board for welding resistors and/or capacitors if they were not to be disposed on the light strip are no longer used, the reliability of the power supply module is improved, in view of the fact that these welding points are very liable to (cause or incur) faults, malfunctions, or failures. Further, the length of conductive lines needed for connecting components on the printed circuit board is therefore also reduced, which allows of a more compact layout of components on the printed circuit board and thus improving the functionalities of these components.

Figure 11A:
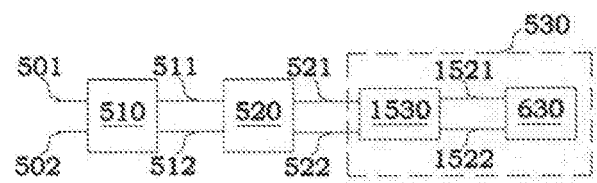
FIG. 11A is a block diagram of an exemplary power supply module in an LED lamp according to some embodiments.

FIG. 11A is a block diagram of a power supply module in an LED lamp according to an embodiment. As shown in FIG. 11A, the power supply module of the LED lamp includes a rectifying circuit 510, a filtering circuit 520, and may further include some parts of an LED lighting module 530. The LED lighting module 530 in this embodiment comprises a driving circuit 1530 and an LED module 630. The driving circuit 1530 comprises a DC-to-DC converter circuit, and is coupled to the filtering output terminals 521 and 522 to receive a filtered signal and then perform power conversion for converting the filtered signal into a driving signal at the driving output terminals 1521 and 1522. The LED module 630 is coupled to the driving output terminals 1521 and 1522 to receive the driving signal for emitting light. In some embodiments, the current of LED module 630 is stabilized at an objective current value. Descriptions of this LED module 630 are the same as those provided above with reference to FIGS. 10A-10D. The power supply module may be, for example, part of the power supply 5 depicted in FIG. 1, and/or may be in the form of the power supply module 250 depicted in FIGS. 4 and 5. For example, the various circuits of the power supply module may include circuit elements attached to a circuit board and/or may include integrated circuits.

In some embodiments, the LED lighting module 530 shown in FIG. 7B may include the driving circuit 1530 and the LED module 630. Thus, the power supply module for the LED lamp in some embodiments can be applied to the single-end power supply structure, such as LED light bulbs, personal area lights (PAL), and so forth.

Figure 11B:
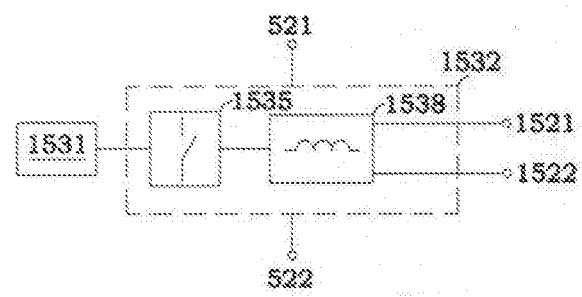
FIG. 11B is a block diagram of a driving circuit according to some embodiments.

FIG. 11B is a block diagram of an exemplary driving circuit according to one embodiment. Referring to FIG. 11B, a driving circuit includes a controller 1531, and a conversion circuit 1532 for power conversion based on a current source, for driving the LED module to emit light. The conversion circuit 1532 includes a switching circuit 1535 and an energy storage circuit 1538. And the conversion circuit 1532 is coupled to the filtering output terminals 521 and 522 to receive and then convert a filtered signal, under the control by the controller 1531, into a driving signal at the driving output terminals 1521 and 1522 for driving the LED module. Under the control by the controller 1531, the driving signal output by the conversion circuit 1532 comprises a steady current, making the LED module emitting steady light.

Figure 11C:
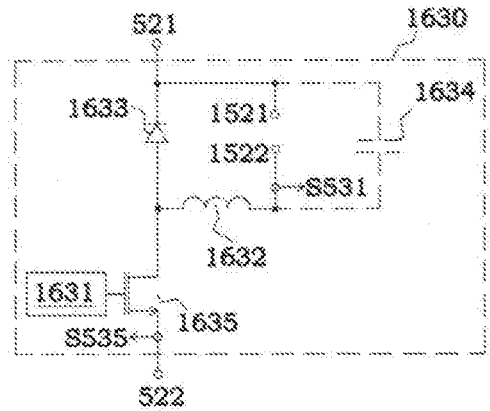
FIG. 11C-11F are schematic diagrams of exemplary driving circuits according to some embodiments.

FIG. 11C is a schematic diagram of an exemplary driving circuit according to one embodiment. Referring to FIG. 11C, a driving circuit 1630 in this embodiment comprises a buck DC-to-DC converter circuit having a controller 1631 and a converter circuit. The converter circuit includes an inductor 1632, a diode 1633 for "freewheeling" of current, a capacitor 1634, and a switch 1635. The driving circuit 1630 is coupled to the filtering output terminals 521 and 522 to receive and then convert a filtered signal into a driving signal for driving an LED module connected between the driving output terminals 1521 and 1522.

In this embodiment, the switch 1635 comprises a metal-oxide-semiconductor field-effect transistor (MOSFET) and has a first terminal coupled to the anode of freewheeling diode 1633, a second terminal coupled to the filtering output terminal 522, and a control terminal coupled to the controller 1631 used for controlling current conduction or cutoff between the first and second terminals of switch 1635. The driving output terminal 1521 is connected to the filtering output terminal 521, and the driving output terminal 1522 is connected to an end of the inductor 1632, which has another end connected to the first terminal of switch 1635. The capacitor 1634 is coupled between the driving output terminals 1521 and 1522 to stabilize the voltage between the driving output terminals 1521 and 1522. The freewheeling diode 1633 has a cathode connected to the driving output terminal 1521.

Next, a description follows as to an exemplary operation of the driving circuit 1630.

The controller 1631 is configured for determining when to turn the switch 1635 on (in a conducting state) or off (in a cutoff state) according to a current detection signal S535 and/or a current detection signal S531. For example, in some embodiments, the controller 1631 is configured to control the duty cycle of switch 1635 being on and switch 1635 being off in order to adjust the size or magnitude of the driving signal. The current detection signal S535 represents the magnitude of current through the switch 1635. The current detection signal S531 represents the magnitude of current through the LED module coupled between the driving output terminals 1521 and 1522. The controller 1631 may control the duty cycle of the switch 1635 being on and off, based on, for example, a magnitude of a current detected based on current detection signal S531 or S535. As such, when the magnitude is above a threshold, the switch may be off (cutoff state) for more time, and when magnitude goes below the threshold, the switch may be on (conducting state) for more time. According to any of current detection signal S535 and current detection signal S531, the controller 1631 can obtain information on the magnitude of power converted by the converter circuit. When the switch 1635 is switched on, a current of a filtered signal is input through the filtering output terminal 521, and then flows through the capacitor 1634, the driving output terminal 1521, the LED module, the inductor 1632, and the switch 1635, and then flows out from the filtering output terminal 522. During this flowing of current, the capacitor 1634 and the inductor 1632 are performing storing of energy. On the other hand, when the switch 1635 is switched off, the capacitor 1634 and the inductor 1632 perform releasing of stored energy by a current flowing from the freewheeling diode 1633 to the driving output terminal 1521 to make the LED module continuing to emit light.

It's worth noting that the capacitor 1634 is an optional element, so it can be omitted and is thus depicted in a dotted line in FIG. 11C. In some application environments, the natural characteristic of an inductor to oppose instantaneous change in electric current passing through the inductor may be used to achieve the effect of stabilizing the current through the LED module, thus omitting the capacitor 1634.

From another aspect, the driving circuit 1630 causes the current of the LED module to remain stable, thus the color temperature may not change with current for some LED modules, such as white, red, blue, green LED modules. For example, the LED can retain the same color temperature under different illumination. In some embodiments, the inductor 1632 playing the role of the energy-storing circuit releases the stored power when the switch 1635 cuts off, and this causes the LED module to continue to emit light and also prevents the voltage/current on the LED module from going to the minimum value. In this way, when the switch 1635 conducts again, the voltage/current does not need to change from the minimum value to the maximum value. Accordingly, the LED module lighting with flickering can be avoided, the entire illumination can be improved, the lowest conducting period can be smaller, and the driving frequency can be higher.

Figure 11D:
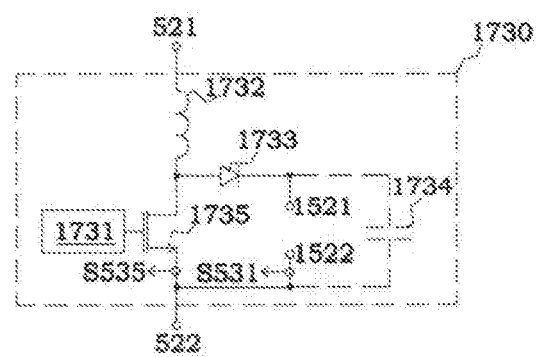

FIG. 11D is a schematic diagram of an exemplary driving circuit according to one embodiment. Referring to FIG. 11D, a driving circuit 1730 in this embodiment comprises a boost DC-to-DC converter circuit having a controller 1731 and a converter circuit. The converter circuit includes an inductor 1732, a diode 1733 for "freewheeling" of current, a capacitor 1734, and a switch 1735. The driving circuit 1730 is configured to receive and then convert a filtered signal from the filtering output terminals 521 and 522 into a driving signal for driving an LED module coupled between the driving output terminals 1521 and 1522.

The inductor 1732 has an end connected to the filtering output terminal 521, and another end connected to the anode of freewheeling diode 1733 and a first terminal of the switch 1735, which has a second terminal connected to the filtering output terminal 522 and the driving output terminal 1522. The freewheeling diode 1733 has a cathode connected to the driving output terminal 1521. And the capacitor 1734 is coupled between the driving output terminals 1521 and 1522.

The controller 1731 is coupled to a control terminal of switch 1735, and is configured for determining when to turn the switch 1735 on (in a conducting state) or off (in a cutoff state), according to a current detection signal S535 and/or a current detection signal S531. When the switch 1735 is switched on, a current of a filtered signal is input through the filtering output terminal 521, and then flows through the inductor 1732 and the switch 1735, and then flows out from the filtering output terminal 522. During this flowing of current, the current through the inductor 1732 increases with time, with the inductor 1732 being in a state of storing energy, while the capacitor 1734 enters a state of releasing energy, making the LED module continuing to emit light. On the other hand, when the switch 1735 is switched off, the inductor 1732 enters a state of releasing energy as the current through the inductor 1732 decreases with time. In this state, the current through the inductor 1732 then flows through the freewheeling diode 1733, the capacitor 1734, and the LED module, while the capacitor 1734 enters a state of storing energy.

It's worth noting that the capacitor 1734 is an optional element, so it can be omitted and is thus depicted in a dotted line in FIG. 11D. When the capacitor 1734 is omitted and the switch 1735 is switched on, the current of inductor 1732 does not flow through the LED module, making the LED module not emit light; but when the switch 1735 is switched off, the current of inductor 1732 flows through the freewheeling diode 1733 to reach the LED module, making the LED module emit light. Therefore, by controlling the time that the LED module emits light, and the magnitude of current through the LED module, the average luminance of the LED module can be stabilized to be above a defined value, thus also achieving the effect of emitting a steady light.

From another aspect, the driving circuit 1730 causes the current of LED module to remain stable, thus the color temperature may not change with current for some LED module, such as white, red, blue, green LED modules. For example, the LED can retain the same color temperature under different illumination. In some embodiments, the inductor 1732 playing the role of the energy-storing circuit releases the stored power when the switch 1735 cuts off, and this causes the LED module to continue to emit light and also prevents the voltage/current on the LED module going to the minimum value. In this way, when the switch 1735 conducts again, the voltage/current does not change from the minimum value to the maximum value. Accordingly, the LED module lighting with flickering can be avoided, the entire illumination can be improved, the lowest conducting period can be smaller, and the driving frequency can be higher.

Figure 11E:
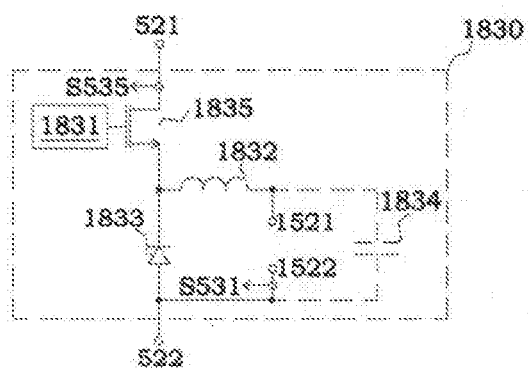

FIG. 11E is a schematic diagram of an exemplary driving circuit according to one embodiment. Referring to FIG. 11E, a driving circuit 1830 in this embodiment comprises a buck DC-to-DC converter circuit having a controller 1831 and a converter circuit. The converter circuit includes an inductor 1832, a diode 1833 for "freewheeling" of current, a capacitor 1834, and a switch 1835. The driving circuit 1830 is coupled to the filtering output terminals 521 and 522 to receive and then convert a filtered signal into a driving signal for driving an LED module connected between the driving output terminals 1521 and 1522.

The switch 1835 has a first terminal coupled to the filtering output terminal 521, a second terminal coupled to the cathode of freewheeling diode 1833, and a control terminal coupled to the controller 1831 to receive a control signal from the controller 1831 for controlling current conduction or cutoff between the first and second terminals of the switch 1835. The anode of freewheeling diode 1833 is connected to the filtering output terminal 522 and the driving output terminal 1522. The inductor 1832 has an end connected to the second terminal of switch 1835, and another end connected to the driving output terminal 1521. The capacitor 1834 is coupled between the driving output terminals 1521 and 1522 to stabilize the voltage between the driving output terminals 1521 and 1522.

The controller 1831 is configured for controlling when to turn the switch 1835 on (in a conducting state) or off (in a cutoff state) according to a current detection signal S535 and/or a current detection signal S531. When the switch 1835 is switched on, a current of a filtered signal is input through the filtering output terminal 521, and then flows through the switch 1835, the inductor 1832, and the driving output terminals 1521 and 1522, and then flows out from the filtering output terminal 522. During this flowing of current, the current through the inductor 1832 and the voltage of the capacitor 1834 both increase with time, so the inductor 1832 and the capacitor 1834 are in a state of storing energy. On the other hand, when the switch 1835 is switched off, the inductor 1832 is in a state of releasing energy and thus the current through it decreases with time. In this case, the current through the inductor 1832 circulates through the driving output terminals 1521 and 1522, the freewheeling diode 1833, and back to the inductor 1832.

It's worth noting that the capacitor 1834 is an optional element, so it can be omitted and is thus depicted in a dotted line in FIG. 11E. When the capacitor 1834 is omitted, no matter whether the switch 1835 is turned on or off, the current through the inductor 1832 will flow through the driving output terminals 1521 and 1522 to drive the LED module to continue emitting light.

From another aspect, the driving circuit 1830 causes the current of the LED module to remain stable, thus the color temperature may not change with current for some LED modules, such as white, red, blue, green LED modules. For example, the LED can retain the same color temperature under different illumination. In some embodiments, the inductor 1832 playing the role of the energy-storing circuit releases the stored power when the switch 1835 cuts off, and causes the LED module to continue to emit light and also prevents the voltage/current on the LED module from going to the minimum value. In this way, when the switch 1835 conducts again, the voltage/current does not need to change from the minimum value to the maximum value. Accordingly, the LED module lighting with flickering can be avoided, the entire illumination can be improved, the lowest conducting period can be smaller, and the driving frequency can be higher.

Figure 11F:
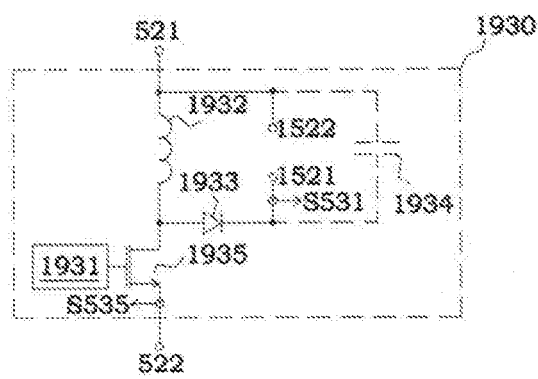

FIG. 11F is a schematic diagram of an exemplary driving circuit according to one embodiment. Referring to FIG. 11F, a driving circuit 1930 in this embodiment comprises a buck DC-to-DC converter circuit having a controller 1931 and a converter circuit. The converter circuit includes an inductor 1932, a diode 1933 for "freewheeling" of current, a capacitor 1934, and a switch 1935. The driving circuit 1930 is coupled to the filtering output terminals 521 and 522 to receive and then convert a filtered signal into a driving signal for driving an LED module connected between the driving output terminals 1521 and 1522.

The inductor 1932 has an end connected to the filtering output terminal 521 and the driving output terminal 1522, and another end connected to a first end of the switch 1935. The switch 1935 has a second end connected to the filtering output terminal 522, and a control terminal connected to controller 1931 to receive a control signal from controller 1931 for controlling current conduction or cutoff of the switch 1935. The freewheeling diode 1933 has an anode coupled to a node connecting the inductor 1932 and the switch 1935, and a cathode coupled to the driving output terminal 1521. The capacitor 1934 is coupled to the driving output terminals 1521 and 1522 to stabilize the driving of the LED module coupled between the driving output terminals 1521 and 1522.

The controller 1931 is configured for controlling when to turn the switch 1935 on (in a conducting state) or off (in a cutoff state) according to a current detection signal S531 and/or a current detection signal S535. When the switch 1935 is turned on, a current is input through the filtering output terminal 521, and then flows through the inductor 1932 and the switch 1935, and then flows out from the filtering output terminal 522. During this flowing of current, the current through the inductor 1932 increases with time, so the inductor 1932 is in a state of storing energy; but the voltage of the capacitor 1934 decreases with time, so the capacitor 1934 is in a state of releasing energy to keep the LED module continuing to emit light. On the other hand, when the switch 1935 is turned off, the inductor 1932 is in a state of releasing energy and its current decreases with time. In this case, the current through the inductor 1932 circulates through the freewheeling diode 1933, the driving output terminals 1521 and 1522, and back to the inductor 1932. During this circulation, the capacitor 1934 is in a state of storing energy and its voltage increases with time.

It's worth noting that the capacitor 1934 is an optional element, so it can be omitted and is thus depicted in a dotted line in FIG. 11F. When the capacitor 1934 is omitted and the switch 1935 is turned on, the current through the inductor 1932 doesn't flow through the driving output terminals 1521 and 1522, thereby making the LED module not emit light. On the other hand, when the switch 1935 is turned off, the current through the inductor 1932 flows through the freewheeling diode 1933 and then the LED module to make the LED module emit light. Therefore, by controlling the time that the LED module emits light, and the magnitude of current through the LED module, the average luminance of the LED module can be stabilized to be above a defined value, thus also achieving the effect of emitting a steady light.

From another aspect, the driving circuit 1930 causes the current of the LED module to remain stable, thus the color temperature may not change with current for some LED modules, such as white, red, blue, green LED modules. For example, the LED can retain the same color temperature under different illumination. In some embodiments, the inductor 1932 playing the role of the energy-storing circuit releases the stored power when the switch 1935 cuts off, and this causes the LED module to continue to emit light and also prevents the voltage/current on the LED module from going to the minimum value. In this way, when the switch 1935 conducts again, the voltage/current does not need to change from the minimum value to the maximum value. Accordingly, the LED module lighting with flickering can be avoided, the entire illumination can be improved, the lowest conducting period can be smaller, and the driving frequency can be higher.

In certain exemplary embodiments, the conversion efficiency of the driving circuits is above 80%. In some embodiments, the conversion efficiency of the driving circuits is above 90%. In still other embodiments, the conversion efficiency of the driving circuits is above 92%. In some embodiments, the illumination efficiency of the LED lamps is above 120 lm/W. In some embodiments, the illumination efficiency of the LED lamps is above 160 lm/W. In some embodiments, the illumination efficiency including the combination of the driving circuits and the LED modules is above 120 lm/W*90%=108 lm/W. In some embodiments, the illumination efficiency including the combination of the driving circuits and the LED modules is above 160 lm/W*92%=147.21 lm/W.

In some embodiments, the transmittance of the diffusion film in the LED tube lamp is above 85%. As a result, in certain embodiments, the illumination efficiency of the LED lamps is above 108 lm/W*85%=91.8 lm/W. In some embodiments, the illumination efficiency of the LED lamps is above 147.21 lm/W*85%=125.12 lm/W.

Figure 12A:
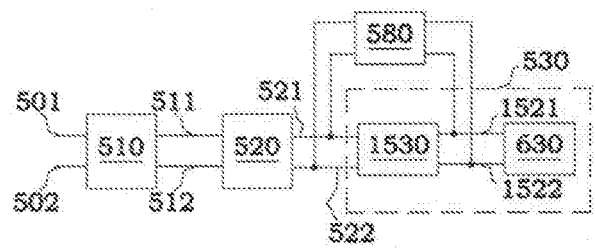
FIG. 12A is a block diagram of an exemplary power supply module in an LED lamp according to some embodiments.

FIG. 12A is a block diagram of a power supply module in an LED lamp according to an embodiment. Compared to FIG. 11A, the embodiment of FIG. 12A includes a rectifying circuit 510, a filtering circuit 520, and a driving circuit 1530, and further includes a mode switching circuit 580. In this embodiment, a driving circuit 1530 and an LED module 630 compose the LED lighting module 530. The mode switching circuit 580 is coupled to at least one of the filtering output terminals 521 and 522 and at least one of the driving output terminals 1521 and 1522, and determines whether to perform a first driving mode or a second driving mode, for example, according to a frequency of the external driving signal. For example, in some embodiments, the mode switching circuit selects the second driving mode and thus inputs a filtered signal to the LED module (described further below) when a frequency of the external driving signal is higher than a specific (e.g., predefined) mode switching frequency, and the mode switching circuit selects the first driving mode and inputs the filtered signal to the driving circuit (described further below) when the frequency of the external driving signal is lower than the specific (e.g., predefined) mode switching frequency.

According to an exemplary embodiment, in the first driving mode, a filtered signal from the filtering circuit 520 is input into the driving circuit 1530, while in the second driving mode the filtered signal bypasses at least a component of the driving circuit 1530, such that the driving circuit 1530 no longer conducts the filtered signal, allowing the filtered signal to reach and drive the LED module 630 without passing through the driving circuit 1530. The bypassed component(s) of the driving circuit 1530 may include an inductor or a switch, for example, which when a bypass mode is selected, it cause the driving circuit 1530 to be unable to transfer and/or convert power, thus causing the driving circuit 1530 to stop conducting the filtered signal. If the driving circuit 1530 includes a capacitor, the capacitor can still be used to filter out ripples of the filtered signal in order to stabilize the voltage across the LED module. When the mode switching circuit 580 determines to perform the first driving mode, thus allowing the filtered signal to be input to the driving circuit 1530, the driving circuit 1530 then transforms the filtered signal into a driving signal for driving the LED module 630 to emit light. On the other hand, when the mode switching circuit 580 determines to perform the second driving mode, thus causing the filtered signal to bypass the driving circuit 1530 to reach the LED module 630, the filtering circuit 520 becomes in effect a driving circuit for LED module 630. Then the filtering circuit 520 provides the filtered signal as a driving signal for the LED module for driving the LED module to emit light.

The mode switching circuit 580 includes components configured to select between a first mode and a second mode, wherein the first mode causes the driving circuit 1530 to function as a driving circuit to transform a filtered signal into a driving signal for driving the LED module, and the second mode is a bypass mode that prevents the driving circuit 1530 from transforming the filtered signal into a driving signal to be transmitted to the LED module. The first mode may be described as a driving mode, or driving circuit mode, and the second mode may be referred to as a bypass mode or driving circuit prevention mode. The mode switching circuit 580 can determine whether to perform the first driving mode or the second driving mode based on a user's instruction or a detected signal received by the LED lamp through the pins 501, 502, 503, and 504. With the mode switching circuit, the power supply module of the LED lamp can adapt to or perform one of appropriate driving modes corresponding to different application environments or driving systems, thus improving the compatibility of the LED lamp.

Figure 12B:
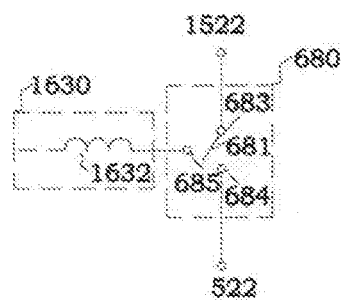
FIG. 12B-12I are schematic diagrams of exemplary mode switching circuits in an LED lamp according to some embodiments.

FIG. 12B is a schematic diagram of a mode switching circuit in an LED lamp according to an exemplary embodiment. Referring to FIG. 12B, a mode switching circuit 680 includes a mode switch 681 suitable for use with the driving circuit 1630 in FIG. 11C. Referring to FIGS. 12B and 11C, the mode switch 681 has three terminals 683, 684, and 685, wherein the terminal 683 is coupled to the driving output terminal 1522, the terminal 684 is coupled to the filtering output terminal 522, and the terminal 685 is coupled to the inductor 1632 in the driving circuit 1630.

When the mode switching circuit 680 determines to perform a first driving mode, the mode switch 681 conducts current in a first conductive path through the terminals 683 and 685 and a second conductive path through the terminals 683 and 684 is in a cutoff state. In this case, the driving output terminal 1522 is coupled to the inductor 1632, and therefore the driving circuit 1630 operates normally according to a driving mode, which includes receiving a filtered signal from the filtering output terminals 521 and 522 and then transforming the filtered signal into a driving signal, and outputting the driving signal at the driving output terminals 1521 and 1522 for driving the LED module.

When the mode switching circuit 680 determines to perform a second driving mode, the mode switch 681 conducts current in the second conductive path through the terminals 683 and 684 and the first conductive path through the terminals 683 and 685 is in a cutoff state. In this case, the driving output terminal 1522 is coupled to the filtering output terminal 522, and therefore the driving circuit 1630 stops working (e.g., no longer converts the filtered signal into a signal that can drive the LED module), and a filtered signal is input through the filtering output terminals 521 and 522 to the driving output terminals 1521 and 1522 for driving the LED module, while bypassing the inductor 1632 and the switch 1635 in the driving circuit 1630.

Figure 12C:
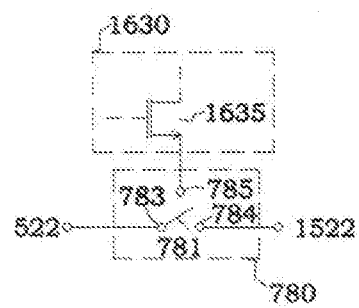

FIG. 12C is a schematic diagram of the mode switching circuit in an LED lamp according to an exemplary embodiment. Referring to FIG. 12C, a mode switching circuit 780 includes a mode switch 781 being suitable for use with the driving circuit 1630 in FIG. 11C. Referring to FIGS. 12C and 11C, the mode switch 781 has three terminals 783, 784, and 785, wherein the terminal 783 is coupled to the filtering output terminal 522, the terminal 784 is coupled to the driving output terminal 1522, and the terminal 785 is coupled to switch 1635 in the driving circuit 1630.

When the mode switching circuit 780 determines to perform a first driving mode, the mode switch 781 conducts current in a first conductive path through the terminals 783 and 785 and a second conductive path through the terminals 783 and 784 is in a cutoff state. In this case, the filtering output terminal 522 is coupled to the switch 1635, and therefore the driving circuit 1630 operates normally, which includes receiving a filtered signal from the filtering output terminals 521 and 522 and then transforming the filtered signal into a driving signal, and outputting the driving signal at the driving output terminals 1521 and 1522 for driving the LED module.

When the mode switching circuit 780 determines to perform a second driving mode, the mode switch 781 conducts current in the second conductive path through the terminals 783 and 784 and the first conductive path through the terminals 783 and 785 is in a cutoff state. In this case, the driving output terminal 1522 is coupled to the filtering output terminal 522, and therefore the driving circuit 1630 stops working, and a filtered signal is input through the filtering output terminals 521 and 522 to the driving output terminals 1521 and 1522 for driving the LED module, while bypassing the inductor 1632 and the switch 1635 in the driving circuit 1630.

Figure 12D:
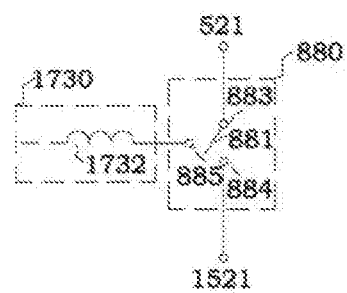

FIG. 12D is a schematic diagram of the mode switching circuit in an LED lamp according to an exemplary embodiment. Referring to FIG. 12D, a mode switching circuit 880 includes a mode switch 881 being suitable for use with the driving circuit 1730 in FIG. 11D. Referring to FIGS. 12D and 11D, the mode switch 881 has three terminals 883, 884, and 885, wherein the terminal 883 is coupled to the filtering output terminal 521, the terminal 884 is coupled to the driving output terminal 1521, and the terminal 885 is coupled to the inductor 1732 in the driving circuit 1730.

When the mode switching circuit 880 determines to perform a first driving mode, the mode switch 881 conducts current in a first conductive path through the terminals 883 and 885 and a second conductive path through the terminals 883 and 884 is in a cutoff state. In this case, the filtering output terminal 521 is coupled to the inductor 1732, and therefore the driving circuit 1730 operates normally, which includes receiving a filtered signal from the filtering output terminals 521 and 522 and then transforming the filtered signal into a driving signal, and outputting the driving signal at the driving output terminals 1521 and 1522 for driving the LED module.

When the mode switching circuit 880 determines to perform a second driving mode, the mode switch 881 conducts current in the second conductive path through the terminals 883 and 884 and the first conductive path through the terminals 883 and 885 is in a cutoff state. In this case, the driving output terminal 1521 is coupled to the filtering output terminal 521, and therefore the driving circuit 1730 stops working, and a filtered signal is input through the filtering output terminals 521 and 522 to the driving output terminals 1521 and 1522 for driving the LED module, while bypassing the inductor 1732 and the freewheeling diode 1733 in the driving circuit 1730.

Figure 12E:
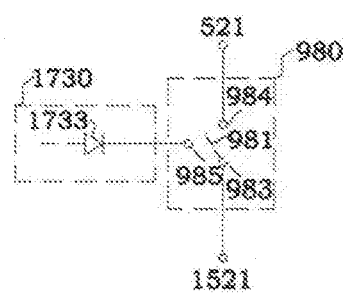

FIG. 12E is a schematic diagram of the mode switching circuit in an LED lamp according to an exemplary embodiment. Referring to FIG. 12E, a mode switching circuit 980 includes a mode switch 981 being suitable for use with the driving circuit 1730 in FIG. 11D. Referring to FIGS. 12E and 11D, the mode switch 981 has three terminals 983, 984, and 985, wherein the terminal 983 is coupled to the driving output terminal 1521, the terminal 984 is coupled to the filtering output terminal 521, and the terminal 985 is coupled to the cathode of diode 1733 in the driving circuit 1730.

When the mode switching circuit 980 determines to perform a first driving mode, the mode switch 981 conducts current in a first conductive path through the terminals 983 and 985, and a second conductive path through the terminals 983 and 984 is in a cutoff state. In this case, the filtering output terminal 521 is coupled to the cathode of diode 1733, and therefore the driving circuit 1730 operates normally, which includes receiving a filtered signal from the filtering output terminals 521 and 522 and then transforming the filtered signal into a driving signal, and outputting the driving signal at the driving output terminals 1521 and 1522 for driving the LED module.

When the mode switching circuit 980 determines to perform a second driving mode, the mode switch 981 conducts current in the second conductive path through the terminals 983 and 984 and the first conductive path through the terminals 983 and 985 is in a cutoff state. In this case, the driving output terminal 1521 is coupled to the filtering output terminal 521, and therefore the driving circuit 1730 stops working, and a filtered signal is input through the filtering output terminals 521 and 522 to the driving output terminals 1521 and 1522 for driving the LED module, while bypassing the inductor 1732 and the freewheeling diode 1733 in the driving circuit 1730.

Figure 12F:
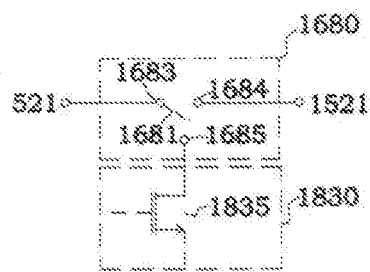

FIG. 12F is a schematic diagram of the mode switching circuit in an LED lamp according to an exemplary embodiment. Referring to FIG. 12F, a mode switching circuit 1680 includes a mode switch 1681 being suitable for use with the driving circuit 1830 in FIG. 11E. Referring to FIGS. 12F and 11E, the mode switch 1681 has three terminals 1683, 1684, and 1685, wherein the terminal 1683 is coupled to the filtering output terminal 521, the terminal 1684 is coupled to the driving output terminal 1521, and the terminal 1685 is coupled to switch 1835 in the driving circuit 1830.

When the mode switching circuit 1680 determines to perform a first driving mode, the mode switch 1681 conducts current in a first conductive path through the terminals 1683 and 1685, and a second conductive path through the terminals 1683 and 1684 is in a cutoff state. In this case, the filtering output terminal 521 is coupled to the switch 1835, and therefore the driving circuit 1830 operates normally, which includes receiving a filtered signal from the filtering output terminals 521 and 522 and then transforming the filtered signal into a driving signal, and outputting the driving signal at the driving output terminals 1521 and 1522 for driving the LED module.

When the mode switching circuit 1680 determines to perform a second driving mode, the mode switch 1681 conducts current in the second conductive path through the terminals 1683 and 1684 and the first conductive path through the terminals 1683 and 1685 is in a cutoff state. In this case, the driving output terminal 1521 is coupled to the filtering output terminal 521, and therefore the driving circuit 1830 stops working, and a filtered signal is input through the filtering output terminals 521 and 522 to the driving output terminals 1521 and 1522 for driving the LED module, while bypassing the inductor 1832 and the switch 1835 in the driving circuit 1830.

Figure 12G:
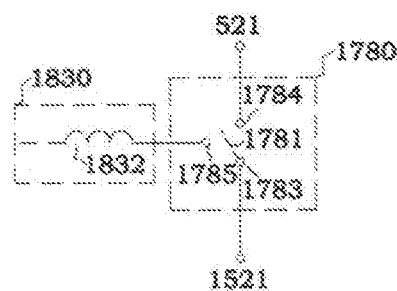

FIG. 12G is a schematic diagram of the mode switching circuit in an LED lamp according to an exemplary embodiment. Referring to FIG. 12G, a mode switching circuit 1780 includes a mode switch 1781 being suitable for use with the driving circuit 1830 in FIG. 11E. Referring to FIGS. 12G and 11E, the mode switch 1781 has three terminals 1783, 1784, and 1785, wherein the terminal 1783 is coupled to the filtering output terminal 521, the terminal 1784 is coupled to the driving output terminal 1521, and the terminal 1785 is coupled to inductor 1832 in the driving circuit 1830.

When the mode switching circuit 1780 determines perform a first driving mode, the mode switch 1781 conducts current in a first conductive path through the terminals 1783 and 1785, and a second conductive path through the terminals 1783 and 1784 is in a cutoff state. In this case, the filtering output terminal 521 is coupled to the inductor 1832, and therefore the driving circuit 1830 operates normally, which includes receiving a filtered signal from the filtering output terminals 521 and 522 and then transforming the filtered signal into a driving signal, output at the driving output terminals 1521 and 1522 for driving the LED module.

When the mode switching circuit 1780 determines to perform a second driving mode, the mode switch 1781 conducts current in the second conductive path through the terminals 1783 and 1784 and the first conductive path through the terminals 1783 and 1785 is in a cutoff state. In this case, the driving output terminal 1521 is coupled to the filtering output terminal 521, and therefore the driving circuit 1830 stops working, and a filtered signal is input through the filtering output terminals 521 and 522 to the driving output terminals 1521 and 1522 for driving the LED module, while bypassing the inductor 1832 and the switch 1835 in the driving circuit 1830.

Figure 12H:
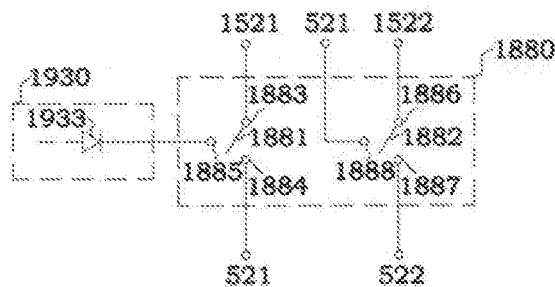

FIG. 12H is a schematic diagram of the mode switching circuit in an LED lamp according to an exemplary embodiment. Referring to FIG. 12H, a mode switching circuit 1880 includes two mode switches 1881 and 1882 being suitable for use with the driving circuit 1930 in FIG. 11F. Referring to FIGS. 12H and 11F, the mode switch 1881 has three terminals 1883, 1884, and 1885, wherein the terminal 1883 is coupled to the driving output terminal 1521, the terminal 1884 is coupled to the filtering output terminal 521, and the terminal 1885 is coupled to the freewheeling diode 1933 in the driving circuit 1930. And the mode switch 1882 has three terminals 1886, 1887, and 1888, wherein the terminal 1886 is coupled to the driving output terminal 1522, the terminal 1887 is coupled to the filtering output terminal 522, and the terminal 1888 is coupled to the filtering output terminal 521.

When the mode switching circuit 1880 determines to perform a first driving mode, the mode switch 1881 conducts current in a first conductive path through the terminals 1883 and 1885, and a second conductive path through the terminals 1883 and 1884 is in a cutoff state, and the mode switch 1882 conducts current in a third conductive path through the terminals 1886 and 1888, and a fourth conductive path through the terminals 1886 and 1887 is in a cutoff state. In this case, the driving output terminal 1521 is coupled to the freewheeling diode 1933, and the filtering output terminal 521 is coupled to the driving output terminal 1522. Therefore the driving circuit 1930 operates normally, which includes receiving a filtered signal from the filtering output terminals 521 and 522 and then transforming the filtered signal into a driving signal, and outputting the driving signal at the driving output terminals 1521 and 1522 for driving the LED module.

When the mode switching circuit 1880 determines to perform a second driving mode, the mode switch 1881 conducts current in the second conductive path through the terminals 1883 and 1884, and the first conductive path through the terminals 1883 and 1885 is in a cutoff state, and the mode switch 1882 conducts current in the fourth conductive path through the terminals 1886 and 1887, and the third conductive path through the terminals 1886 and 1888 is in a cutoff state. In this case, the driving output terminal 1521 is coupled to the filtering output terminal 521, and the filtering output terminal 522 is coupled to the driving output terminal 1522. Therefore the driving circuit 1930 stops working, and a filtered signal is input through the filtering output terminals 521 and 522 to the driving output terminals 1521 and 1522 for driving the LED module, while bypassing the freewheeling diode 1933 and the switch 1935 in the driving circuit 1930.

Figure 12I:
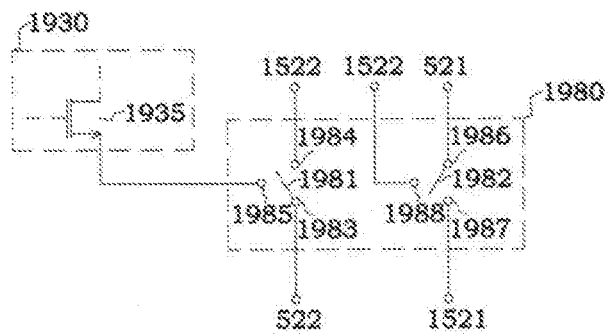

FIG. 12I is a schematic diagram of the mode switching circuit in an LED lamp according to an exemplary embodiment. Referring to FIG. 12I, a mode switching circuit 1980 includes two mode switches 1981 and 1982 being suitable for use with the driving circuit 1930 in FIG. 11F. Referring to FIGS. 12I and 11 F, the mode switch 1981 has three terminals 1983, 1984, and 1985, wherein the terminal 1983 is coupled to the filtering output terminal 522, the terminal 1984 is coupled to the driving output terminal 1522, and the terminal 1985 is coupled to switch 1935 in the driving circuit 1930. And the mode switch 1982 has three terminals 1986, 1987, and 1988, wherein the terminal 1986 is coupled to the filtering output terminal 521, the terminal 1987 is coupled to the driving output terminal 1521, and the terminal 1988 is coupled to the driving output terminal 1522.

When the mode switching circuit 1980 determines to perform a first driving mode, the mode switch 1981 conducts current in a first conductive path through the terminals 1983 and 1985, and a second conductive path through the terminals 1983 and 1984 is in a cutoff state, and the mode switch 1982 conducts current in a third conductive path through the terminals 1986 and 1988, and a fourth conductive path through the terminals 1986 and 1987 is in a cutoff state. In this case, driving output terminal 1522 is coupled to the filtering output terminal 521, and the filtering output terminal 522 is coupled to the switch 1935. Therefore the driving circuit 1930 operates normally, which includes receiving a filtered signal from the filtering output terminals 521 and 522 and then transforming the filtered signal into a driving signal, and outputting the driving signal at the driving output terminals 1521 and 1522 for driving the LED module.

When the mode switching circuit 1980 determines to perform a second driving mode, the mode switch 1981 conducts current in the second conductive path through the terminals 1983 and 1984, and the first conductive path through the terminals 1983 and 1985 is in a cutoff state, and the mode switch 1982 conducts current in the fourth conductive path through the terminals 1986 and 1987, and the third conductive path through the terminals 1986 and 1988 is in a cutoff state. In this case, the driving output terminal 1521 is coupled to the filtering output terminal 521, and the filtering output terminal 522 is coupled to the driving output terminal 1522. Therefore the driving circuit 1930 stops working, and a filtered signal is input through the filtering output terminals 521 and 522 to the driving output terminals 1521 and 1522 for driving the LED module, while bypassing the freewheeling diode 1933 and the switch 1935 in the driving circuit 1930.

The mode switches in the above embodiments may each comprise, for example, a single-pole double-throw switch, or comprise two semiconductor switches (such as metal oxide semiconductor transistors), for switching a conductive path on to conduct current while leaving the other conductive path cutoff. Each of the two conductive paths provides a path for conducting the filtered signal, allowing the current of the filtered signal to flow through one of the two paths, thereby achieving the function of mode switching or selection.

In the various exemplary embodiments of mode switching circuits described above, the determination of whether to perform a first driving mode or a second driving mode may be a selection based on, for example, a signal sent to the mode switching circuit. For example, the signal may be set by a person (e.g., based on selecting a switch on the LED tube lamp), or may be set by circuitry within the LED tube lamp without user interaction. In either case, the mode switching circuit is configured to select between a driving mode and a bypass mode.

For example, with reference to FIG. 7A, when the lamp driving circuit 505 is not present and the LED tube lamp 500 is directly supplied current by the AC power supply 508, the mode switching circuit may determine to perform a first driving mode in which the driving circuit transforms the filtered signal into a driving signal with a logic level meeting a particular logic level to properly drive the LED module to emit light. On the other hand, when the lamp driving circuit 505 is present, the mode switching circuit may determine to perform a second driving mode in which the filtered signal is used to drive the LED module to emit light through the bypass path and not through the driving circuit. The determination, or selection, between the first driving mode and second driving mode may be made, for example, based on a control circuit in the LED tube lamp 500. In some embodiments, the control circuitry could cause the mode switching circuit to determine to perform the first driving mode to drive the LED module to emit light even when the lamp driving circuit 505 is present.

Figure 13A:
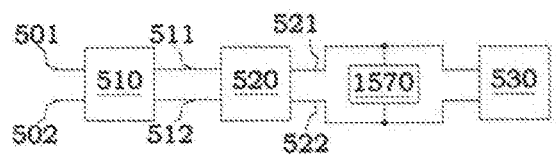
FIG. 13A is a block diagram of an exemplary power supply module in an LED tube lamp according to some embodiments.

FIG. 13A is a block diagram of a power supply module in an LED tube lamp according to an exemplary embodiment. Compared to that shown in FIG. 11A, the present embodiment comprises a rectifying circuit 510, a filtering circuit 520, and a driving circuit 1530, and further comprises an over voltage protection (OVP) circuit 1570. In this embodiment, a driving circuit 1530 and an LED module 630 compose the LED lighting module 530. The OVP circuit 1570 is coupled to the filtering output terminals 521 and 522 for detecting the filtered signal. The OVP circuit 1570 clamps the logic level of the filtered signal when determining the logic level thereof higher than a defined OVP value. Hence, the OVP circuit 1570 protects the LED lighting module 530 from damage due to an OVP condition.

Figure 13B:
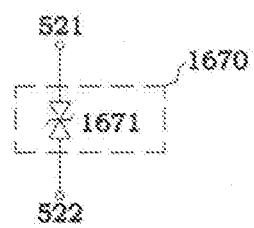
FIG. 13B is a schematic diagram of an over-voltage protection (OVP) circuit according to some embodiments.

FIG. 13B is a schematic diagram of an overvoltage protection (OVP) circuit according to an exemplary embodiment. An OVP circuit 1670 comprises a voltage clamping diode 1671, such as zener diode, coupled to the filtering output terminals 521 and 522. The voltage clamping diode 1671 is configured to clamp a voltage difference at a breakdown voltage when the voltage difference of the filtering output terminals 521 and 522 (i.e., the logic level of the filtered signal) reaches the breakdown voltage. In some embodiments, the breakdown voltage may be in a range of about 40 V to about 100 V. In certain embodiments, the breakdown voltage may be in a range of about 55 V to about 75V.

Figure 14A:
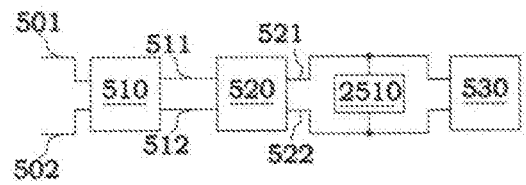
FIG. 14A is a block diagram of an exemplary power supply module in an LED tube lamp according to some embodiments.

FIG. 14A is a block diagram of a power supply module in an LED tube lamp according to an exemplary embodiment. Compared to that shown in FIG. 11A, the present embodiment comprises a rectifying circuit 510, a filtering circuit 520, and a driving circuit 1530, and further comprises an auxiliary power module 2510. The auxiliary power module 2510 is coupled between the filtering output terminals 521 and 522. The auxiliary power module 2510 detects the filtered signal in the filtering output terminals 521 and 522, and determines whether providing an auxiliary power to the filtering output terminals 521 and 522 based on the detected result. When the supply of the filtered signal is stopped or a logic level thereof is insufficient, i.e., when a drive voltage for the LED module is below a defined threshold voltage, the auxiliary power module provides auxiliary power to cause the LED lighting module 530 to continue to emit light. The threshold voltage may be determined according to an auxiliary power voltage amount provided by the auxiliary power module 2510.

Figure 14B:
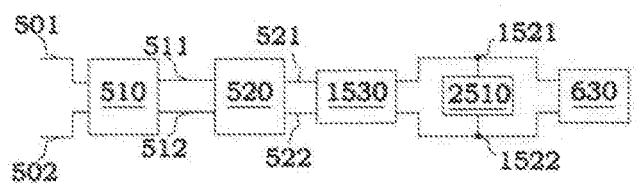
FIG. 14B is a block diagram of an exemplary power supply module in an LED tube lamp according to some embodiments.

FIG. 14B is a block diagram of a power supply module in an LED tube lamp according to an exemplary embodiment. Compared to that shown in FIG. 14A, the present embodiment comprises a rectifying circuit 510, a filtering circuit 520, and may further include some parts of an LED lighting module 530, and an auxiliary power module 2510, and the LED lighting module 530 further comprises a driving circuit 1530 and an LED module 630. The auxiliary power module 2510 is coupled between the driving output terminals 1521 and 1522. The auxiliary power module 2510 detects the driving signal in the driving output terminals 1521 and 1522, and determines whether to provide an auxiliary power to the driving output terminals 1521 and 1522 based on the detected result. When the driving signal is no longer being supplied or a logic level thereof is insufficient, the auxiliary power module 2510 provides the auxiliary power to keep the LED module 630 continuously light.

Figure 14C:
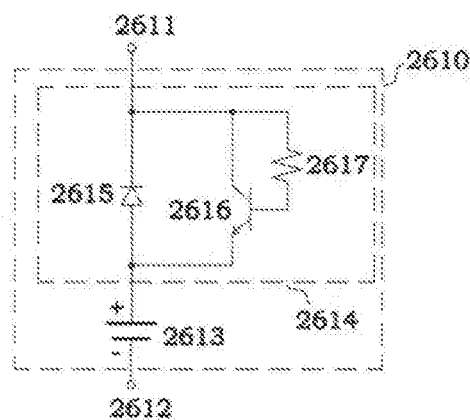
FIG. 14C is a schematic diagram of an auxiliary power module according to some embodiments.

FIG. 14C is a schematic diagram of an auxiliary power module according to an exemplary embodiment. The auxiliary power module 2610 comprises an energy storage unit 2613 and a voltage detection circuit 2614. The auxiliary power module further comprises an auxiliary power positive terminal 2611 and an auxiliary power negative terminal 2612 for being respectively coupled to the filtering output terminals 521 and 522 or the driving output terminals 1521 and 1522. The voltage detection circuit 2614 detects a logic level of a signal at the auxiliary power positive terminal 2611 and the auxiliary power negative terminal 2612 to determine whether to release outward the power of the energy storage unit 2613 through the auxiliary power positive terminal 2611 and the auxiliary power negative terminal 2612.

In one exemplary embodiment, the energy storage unit 2613 is a battery or a supercapacitor. When a voltage difference of the auxiliary power positive terminal 2611 and the auxiliary power negative terminal 2612 (the drive voltage for the LED module) is higher than the auxiliary power voltage of the energy storage unit 2613, the voltage detection circuit 2614 charges the energy storage unit 2613 by the signal in the auxiliary power positive terminal 2611 and the auxiliary power negative terminal 2612. When the drive voltage is lower than the auxiliary power voltage, the energy storage unit 2613 releases the stored energy outward through the auxiliary power positive terminal 2611 and the auxiliary power negative terminal 2612.

In one embodiment, the voltage detection circuit 2614 comprises a diode 2615, a bipolar junction transistor (BJT) 2616 and a resistor 2617. A positive end of the diode 2615 is coupled to a positive end of the energy storage unit 2613 and a negative end of the diode 2615 is coupled to the auxiliary power positive terminal 2611. The negative end of the energy storage unit 2613 is coupled to the auxiliary power negative terminal 2612. A collector of the BJT 2616 is coupled to the auxiliary power positive terminal 2611, and an emitter thereof is coupled to the positive end of the energy storage unit 2613. One end of the resistor 2617 is coupled to the auxiliary power positive terminal 2611 and the other end is coupled to a base of the BJT 2616. When the collector of the BJT 2616 is a cut-in voltage higher than the emitter thereof, the resistor 2617 conducts the BJT 2616. When the power source provides power to the LED tube lamp normally, the energy storage unit 2613 is charged by the filtered signal through the filtering output terminals 521 and 522 and the conducted BJT 2616 or by the driving signal through the driving output terminals 1521 and 1522 and the conducted BJT 2616 until the collector-emitter voltage of the BJT 2616 is lower than or equal to the cut-in voltage. When the filtered signal or the driving signal is no longer being supplied or the logic level thereof is insufficient, the energy storage unit 2613 provides power through the diode 2615 to keep the LED lighting module 530 or the LED module 630 continuously light.

In some embodiments, the maximum voltage of the charged energy storage unit 2613 is at least one cut-in voltage of the BJT 2616 lower than the voltage difference applied between the auxiliary power positive terminal 2611 and the auxiliary power negative terminal 2612. In some embodiments, the voltage difference provided between the auxiliary power positive terminal 2611 and the auxiliary power negative terminal 2612 is a turn-on voltage of the diode 2615 lower than the voltage of the energy storage unit 2613. Hence, when the auxiliary power module 2610 provides power, the voltage applied at the LED module 630 is lower (about the sum of the cut-in voltage of the BJT 2616 and the turn-on voltage of the diode 2615). In the embodiment shown in the FIG. 14B, the brightness of the LED module 630 is reduced when the auxiliary power module supplies power thereto. Thereby, when the auxiliary power module is applied to an emergency lighting system or a constant lighting system, the user realizes the main power supply, such as commercial power, is abnormal and then performs necessary precautions therefor.

The abovementioned features can be implemented in various combinations of the different embodiments to improve the LED tube lamp. For example, the different driving circuits and different mode switching circuits described in FIGS. 11C to 11F and 12B to 12I can be combined with the different physical configurations depicted in FIGS. 1-6, in various ways to implement an LED tube lamp.

Turning back to FIGS. 4-6, in some embodiments, the LED light strip 2 and the power supply 5 may be connected by utilizing the circuit board assembly 25 instead of solder bonding. The long circuit sheet 251 and the short circuit board 253 are adhered to each other with the short circuit board 253 being adjacent to the side edge of the long circuit sheet 251. And then, the power supply module 250 is electrically connected to the wiring layer 2a of the LED light strip 2. Also, the LED light strip 2 as mentioned before is not limited to one-layered or two-layered circuit board, and it could be the circuit board shown in FIG. 6 further including another wiring layer 2c. The LED light source 202 is configured on the wiring layer 2a and electrically connected to the power supply 5 through the wiring layer 2a. As shown in FIG. 5, in some embodiments, the circuit board assembly 25 has the long circuit sheet 251 and the short circuit board 253, and the long circuit sheet 251 could be the bendable circuit sheet of the LED light strip 2 including the wiring layer 2a and the dielectric layer 2b. The dielectric layer 2b and the short circuit board 253 are fixed by a joint manner, and then the wiring layer 2a is adhered to the dielectric layer 2b and extends to the short circuit board 253. The embodiments mentioned above do not depart from the scope of and are all included in the applications of the circuit board assembly 25.

In the embodiments mentioned above, the short circuit board 253 may have a length generally of about 15 mm to about 40 mm and may be about 19 mm to about 36 mm, while the long circuit sheet 251 may have a length generally of about 800 mm to about 2800 mm and may be about 1200 mm to about 2400 mm. In some embodiments, a ratio of the length of the short circuit board 253 to the length of the long circuit sheet 251 ranges from about 1:20 to about 1:200.

In addition, in some abovementioned embodiments, when the LED light strip 2 and the power supply 5 are fixed by soldering bonding but the LED light strip 2 is not mounted onto the inner circumferential surface of the LED tube lamp, the LED light strip 2 may not safely fix and support the power supply 5. Moreover, in some embodiments, when the power supply 5 has to be fixed in the end cap of the end region of the LED tube lamp, the end cap would be relatively longer and then reduces the effectively emitting area of the LED tube lamp.

In some embodiments, the LED tube lamp includes a first side end cap and a second side end cap opposite the first side end cap. In some embodiments, the length of the second side end cap is shorter than that of the first side end cap. In general, the length of the second side end cap may be about 30% to 80% times that of the first side end cap, for example, the length of the second side end cap is in some embodiments about ⅔ of the length of first side end cap. In some embodiments, the length of the second side end cap may be about half the length of the first side end cap. The length of the first side end cap may be, e.g., in the range of about 15 mm to 65 mm, depending on practical situations.

With reference to FIGS. 4 and 5, a short circuit board 253 includes a first short circuit substrate and a second short circuit substrate respectively connected to two terminal portions of a long circuit sheet 251, and the electronic components of the power supply module are respectively disposed on the first short circuit substrate and the second short circuit substrate. The first short circuit substrate and the second short circuit substrate may have roughly the same length, or different lengths. In general, the first short circuit substrate (i.e. the right circuit substrate of short circuit board 253 in FIG. 4 and the left circuit substrate of short circuit board 253 in FIG. 5) has a length that is about 30%-80% of the length of the second short circuit substrate (i.e. the left circuit substrate of short circuit board 253 in FIG. 4 and the right circuit substrate of short circuit board 253 in FIG. 5). In some embodiments, the length of the first short circuit substrate is about ⅓-⅔ of the length of the second short circuit substrate. For example, in one embodiment, the length of the first short circuit substrate may be about half the length of the second short circuit substrate. The length of the second short circuit substrate may be, for example in the range of about 15 mm to about 65 mm, depending on actual application occasions. In certain embodiments, the first short circuit substrate is disposed in an end cap at an end of the LED tube lamp, and the second short circuit substrate is disposed in another end cap at the opposite end of the LED tube lamp.

The above-mentioned features of the present disclosure can be accomplished in any combination to improve the LED tube lamp, and the above embodiments are described by way of example only. The present invention is not herein limited, and many variations are possible without departing from the spirit of the present invention and the scope as defined in the appended claims.

What is claimed is:

1. A light-emitting diode (LED) tube lamp, comprising:
    a lamp tube, configured to receive an external driving signal;
    a rectifying circuit, configured to rectify the external driving signal to produce a rectified signal;
    a filtering circuit, coupled to the rectifying circuit, and configured to filter the rectified signal to produce a filtered signal, wherein the filtering circuit has a first filtering output terminal and a second filtering output terminal;
    an LED lighting module, coupled to the filtering circuit, wherein the LED lighting module includes a driving circuit having a first driving output terminal and a second driving output terminal and configured to receive the filtered signal to produce a driving signal, and an LED module coupled between the first and the second driving output terminals and configured to receive the driving signal and emit light; and
    a mode switching circuit, coupled to at least one of the first filtering output terminal and the second filtering output terminal and at least one of the first driving output terminal and the second driving output terminal, and configured to select between performing one of a first driving mode and a second driving mode,
    wherein the LED tube lamp is configured such that the filtered signal is input to the driving circuit in the first driving mode, and the filtered signal is input to the LED module as the driving signal by bypassing the driving circuit in the second driving mode.

2. The LED tube lamp according to claim 1, wherein the mode switching circuit is configured to select between inputting the filtered signal to one of the driving circuit and the LED module based on a frequency of the external driving signal.

3. The LED tube lamp according to claim 1,
    wherein the mode switching circuit is configured to input the filtered signal to the LED module when a frequency of the external driving signal is higher than a predefined mode switching frequency, and
    wherein the mode switching circuit is configured to input the filtered signal to the driving circuit when the frequency of the external driving signal is lower than the predefined mode switching frequency.

4. The LED tube lamp according to claim 1, wherein the driving circuit further includes a switch, a diode, and an inductor,
    a first pin of the switch is coupled to an anode of the diode, a second pin of the switch is coupled to the second filtering output terminal, and a control pin of the switch is coupled to a controller,
    a cathode of the diode is coupled to the first filtering output terminal and the first driving output terminal,
    a first pin of the inductor is coupled to the first pin of the switch, and a second pin of the inductor is coupled to the mode switching circuit.

5. The LED tube lamp according to claim 4, wherein the mode switching circuit includes a mode switching switch having a first terminal, a second terminal, and a third terminal,
    the first terminal is coupled to the second driving output terminal,
    the second terminal is coupled to the second filtering output terminal, and
    the third terminal is coupled to the second pin of the inductor.

6. The LED tube lamp according to claim 1, wherein the driving circuit further includes a switch, a diode, and an inductor,
   a first pin of the switch is coupled to an anode of the diode, a second pin of the switch is coupled to the mode switching circuit, and a control pin of the switch is coupled to a controller,
   a cathode of the diode is coupled to the first filtering output terminal and the first driving output terminal,
   a first pin of the inductor is coupled to the first pin of the switch, and a second pin of the inductor is coupled to the second driving output terminal.

7. The LED tube lamp according to claim 6, wherein the mode switching circuit includes a mode switching switch having a first terminal, a second terminal, and a third terminal,
   the first terminal is coupled to the second filtering output terminal,
   the second terminal is coupled to the second driving output terminal, and
   the third terminal is coupled to the second pin of the switch.

8. The LED tube lamp according to claim 1, wherein the driving circuit further includes a switch, a diode, and an inductor,
   a first pin of the switch is coupled to an anode of the diode, a second pin of the switch is coupled to the second filtering output terminal and the second driving output terminal, and a control pin of the switch is coupled to a controller,
   a cathode of the diode is coupled to the first driving output terminal,
   a first pin of the inductor is coupled to the first pin of the switch, and a second pin of the inductor is coupled to the mode switching circuit.

9. The LED tube lamp according to claim 8, wherein the mode switching circuit includes a mode switching switch having a first terminal, a second terminal, and a third terminal,
   the first terminal is coupled to the first filtering output terminal,
   the second terminal is coupled to the first driving output terminal, and
   the third terminal is coupled to the second pin of the inductor.

10. The LED tube lamp according to claim 1, wherein the driving circuit further includes a switch, a diode, and an inductor,
   a first pin of the switch is coupled to an anode of the diode, a second pin of the switch is coupled to the second filtering output terminal and the second driving output terminal, and a control pin of the switch is coupled to a controller,
   a cathode of the diode is coupled to the mode switching circuit,
   a first pin of the inductor is coupled to the first pin of the switch, and a second pin of the inductor is coupled to the first filtering output terminal.

11. The LED tube lamp according to claim 10, wherein the mode switching circuit includes a mode switching switch having a first terminal, a second terminal, and a third terminal,
   the first terminal is coupled to the first driving output terminal,
   the second terminal is coupled to the first filtering output terminal, and
   the third terminal is coupled to the cathode of the diode.

12. The LED tube lamp according to claim 1, wherein the driving circuit further includes a switch, a diode, and an inductor,
   a first pin of the switch is coupled to the mode switching circuit, a second pin of the switch is coupled to a cathode of the diode, and a control pin of the switch is coupled to a controller,
   an anode of the diode is coupled to the second filtering output terminal and the second driving output terminal,
   a first pin of the inductor is coupled to the second pin of the switch, and a second pin of the inductor is coupled to the first driving output terminal.

13. The LED tube lamp according to claim 12, wherein the mode switching circuit includes a mode switching switch having a first terminal, a second terminal, and a third terminal,
   the first terminal is coupled to the first filtering output terminal,
   the second terminal is coupled to the first driving output terminal, and the third terminal is coupled to the first pin of the switch.

14. The LED tube lamp according to claim 1, wherein the driving circuit further includes a switch, a diode, and an inductor,
   a first pin of the switch is coupled to the first filtering output terminal, a second pin of the switch is coupled to a cathode of the diode, and a control pin of the switch is coupled to a controller,
   an anode of the diode is coupled to the second filtering output terminal and the second driving output terminal,
   a first pin of the inductor is coupled to the second pin of the switch, and a second pin of the inductor is coupled to the mode switching circuit.

15. The LED tube lamp according to claim 14, wherein the mode switching circuit includes a mode switching switch having a first terminal, a second terminal, and a third terminal,
   the first terminal is coupled to the first driving output terminal,
   the second terminal is coupled to the first filtering output terminal, and
   the third terminal is coupled to the second pin of the inductor.

16. The LED tube lamp according to claim 1, wherein the driving circuit further includes a switch, a diode, and an inductor,
   a first pin of the switch is coupled to an anode of the diode, a second pin of the switch is coupled to the second filtering output terminal, and a control pin of the switch is coupled to a controller,
   a cathode of the diode is coupled to the mode switching circuit,
   a first pin of the inductor is coupled to the first pin of the switch, and a second pin of the inductor is coupled to the first filtering output terminal.

17. The LED tube lamp according to claim 16, wherein the mode switching circuit includes a first mode switching switch having a first terminal, a second terminal, and a third terminal, and a second mode switching switch having a fourth terminal, a fifth terminal, and a sixth terminal,
   the first terminal is coupled to the first driving output terminal,
   the second terminal is coupled to the first filtering output terminal,
   the third terminal is coupled to the cathode of the diode,
   the fourth terminal is coupled to the second driving output terminal, the fifth terminal is coupled to the second filtering output terminal, and the sixth terminal is coupled to the first filtering output terminal.

18. The LED tube lamp according to claim 1, wherein the driving circuit further includes a switch, a diode, and an inductor, a first pin of the switch is coupled to an anode of the diode, a second pin of the switch is coupled to the mode switching circuit, and a control pin of the switch is coupled to a controller, a cathode of the diode is coupled to the first driving output terminal, a first pin of the inductor is coupled to the first pin of the switch, and a second pin of the inductor is coupled to the second driving output terminal.

19. The LED tube lamp according to claim 18, wherein the mode switching circuit includes a first mode switching switch having a first terminal, a second terminal, and a third terminal, and a second mode switching switch having a fourth terminal, a fifth terminal, and a sixth terminal, the first terminal is coupled to the second filtering output terminal, the second terminal is coupled to the second driving output terminal, the third terminal is coupled to the second pin of the switch, the fourth terminal is coupled to the first filtering output terminal, the fifth terminal is coupled to the first driving output terminal, and the sixth terminal is coupled to the second driving output terminal.

20. An LED tube lamp, comprising:

a lamp tube, configured to receive an external signal;

a filtering circuit, configured to filter a received signal and output a filtered signal, the filtered signal derived from the external signal, wherein the filtering circuit has a first filtering output terminal and a second filtering output terminal;

an LED driving circuit coupled to the filtering circuit and having a first driving output terminal and a second driving output terminal, the driving circuit configured to receive the filtered signal and to produce a driving signal;

an LED module coupled to the LED driving circuit and configured to receive the driving signal and emit light; and a mode switching circuit, coupled to at least one of the first filtering output terminal and the second filtering output terminal and at least one of the first driving output terminal and the second driving output terminal, and configured to select between performing one of a first driving mode and a second driving mode, wherein the mode switching circuit is configured to cause the LED driving circuit to operate to receive the filtered signal and produce the driving signal when the first driving mode is selected, and to cause the LED driving circuit to be bypassed in the second driving mode.

* * * * *

UNITED STATES PATENT AND TRADEMARK OFFICE
CERTIFICATE OF CORRECTION

| | |
|---|---|
| PATENT NO. | : 9,521,718 B2 |
| APPLICATION NO. | : 15/084483 |
| DATED | : December 13, 2016 |
| INVENTOR(S) | : Aiming Xiong et al. |

It is certified that error appears in the above-identified patent and that said Letters Patent is hereby corrected as shown below:

On the Title Page

Assignee is listed as:
JIAXING SUPER LIGHTING ELECTRIC APPLIANCE CO., LTI
Jiaxing, Zhejiang (CN)

Assignee should be listed as:
JIAXING SUPER LIGHTING ELECTRIC APPLIANCE CO., LTD.
Jiaxing, Zhejiang (CN)

Signed and Sealed this
Twenty-fifth Day of April, 2017

Michelle K. Lee
*Director of the United States Patent and Trademark Office*